(12) United States Patent
Yavid et al.

(10) Patent No.: US 6,832,724 B2
(45) Date of Patent: Dec. 21, 2004

(54) ELECTRO-OPTICAL ASSEMBLY FOR IMAGE PROJECTION, ESPECIALLY IN PORTABLE INSTRUMENTS

(75) Inventors: Dmitriy Yavid, St. James, NY (US); Frederick R. Wood, Medford, NY (US); Miklos Stern, Flusing, NY (US); Chinh Tan, Setauket, NY (US); Edward Barkan, Miller Place, NY (US); Shane MacGregor, Forest Hills, NY (US); Joseph Katz, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 173 days.

(21) Appl. No.: 10/090,653

(22) Filed: Mar. 4, 2002

(65) Prior Publication Data

US 2002/0125324 A1 Sep. 12, 2002

Related U.S. Application Data

(63) Continuation-in-part of application No. 09/604,197, filed on Jun. 27, 2000, now Pat. No. 6,655,597.

(51) Int. Cl.$^7$ .............................................. G06K 7/14
(52) U.S. Cl. ...................................... 235/454; 359/201
(58) Field of Search .............................. 235/454, 455, 235/462.32, 462.36, 472.01, 472.02, 472.03, 462.01, 472.1; 359/201, 202

(56) References Cited

U.S. PATENT DOCUMENTS

| | | | |
|---|---|---|---|
| 4,979,030 A | 12/1990 | Murata | |
| 5,032,924 A | * 7/1991 | Brown et al. | 348/759 |
| 5,311,321 A | 5/1994 | Crowley | |
| 5,506,394 A | * 4/1996 | Plesko | 235/462.46 |
| 5,673,139 A | 9/1997 | Johnson | |
| 5,680,233 A | 10/1997 | Faris et al. | |
| 5,986,996 A | * 11/1999 | Kitamura et al. | 369/112.16 |
| 6,018,408 A | 1/2000 | Hong | |
| 6,023,374 A | 2/2000 | Hwang | |
| 6,036,098 A | 3/2000 | Goldman et al. | |
| 6,087,645 A | 7/2000 | Kitajima et al. | |
| 6,122,023 A | 9/2000 | Chen et al. | |
| 6,137,105 A | 10/2000 | Drobot et al. | |
| 6,151,167 A | 11/2000 | Melville | |
| 6,275,219 B1 | 8/2001 | Isenman | 345/173 |
| 6,285,489 B1 | 9/2001 | Helsel et al. | |

FOREIGN PATENT DOCUMENTS

| | | |
|---|---|---|
| KR | 2001-0051437 | 6/2001 |
| WO | WO 01/33866 A1 | 5/2001 |
| WO | WO 01/93006 A1 | 12/2001 |
| WO | WO 01/93182 A1 | 12/2001 |

OTHER PUBLICATIONS

IEEE Journal [OPtical Raster–Scanning Displys Based on Surface–Micromachined Polysilicon Mirrors] by Paul M. Hagelin; Jan. 1999, vol. 5; pp. 67–74.*

Yoshihihiro Kajiki; IEEE Transactions on Circuits and Systems for Video Technology; Mar. 2000; vol. 10, No. 2; p. 254–260.*

IEEE Circuits & Devices, vol. 13, No. 4, Jul. 1997, MEM's the Word for Optical Beam Manipulation, Building Microelectromechanical–Based Optical Systems on a Silicon Chip, k. y. Lau, pp. 11–17.

* cited by examiner

Primary Examiner—Diane I. Lee
(74) Attorney, Agent, or Firm—Kirschstein, et al.

(57) ABSTRACT

An arrangement for and method of projecting an image on a viewing surface include sweeping a light beam along a plurality of scan lines that extend over the viewing surface, and selectively illuminating parts of the image at selected positions of the light beam on the scan lines. The viewing surface can be remote from a housing supporting the arrangement, or can be located on the housing.

55 Claims, 26 Drawing Sheets

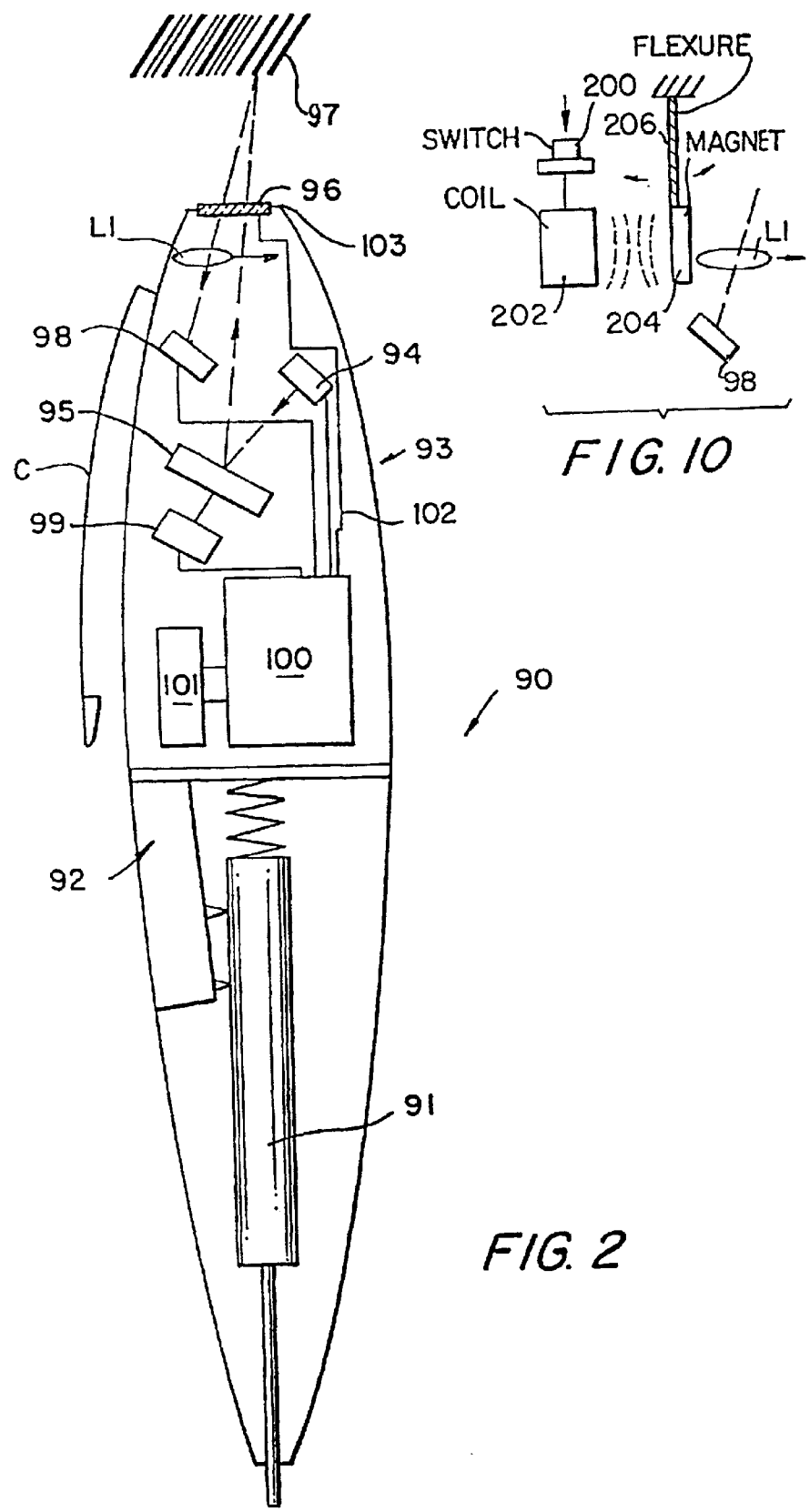

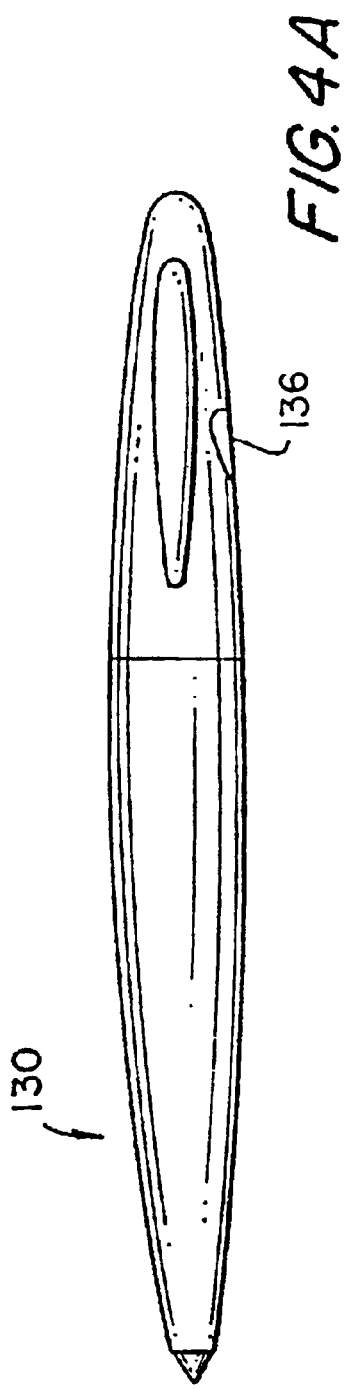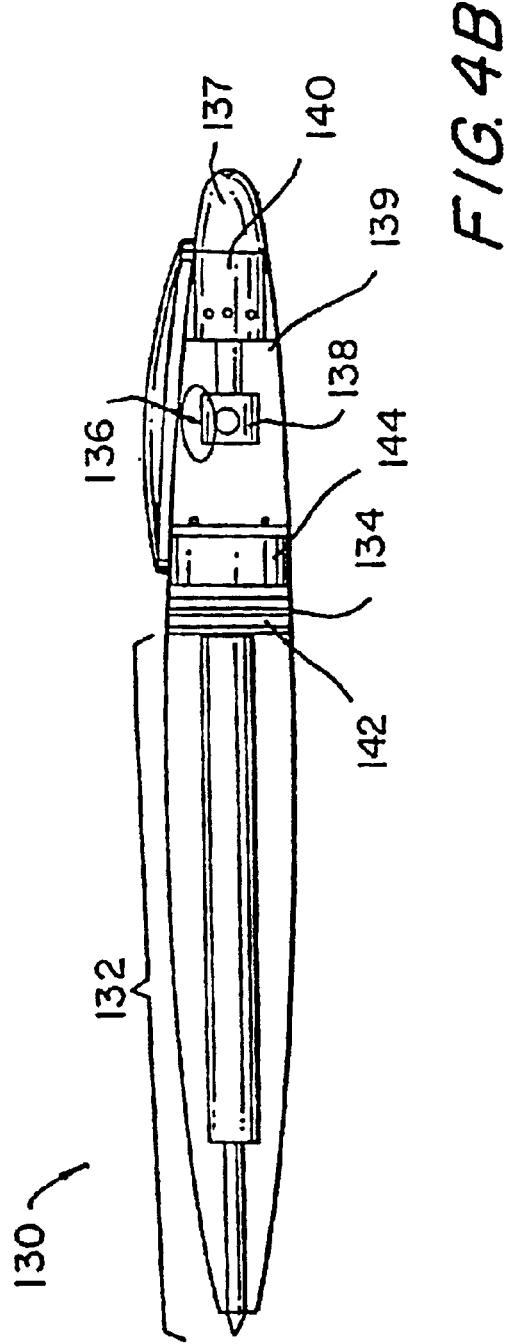

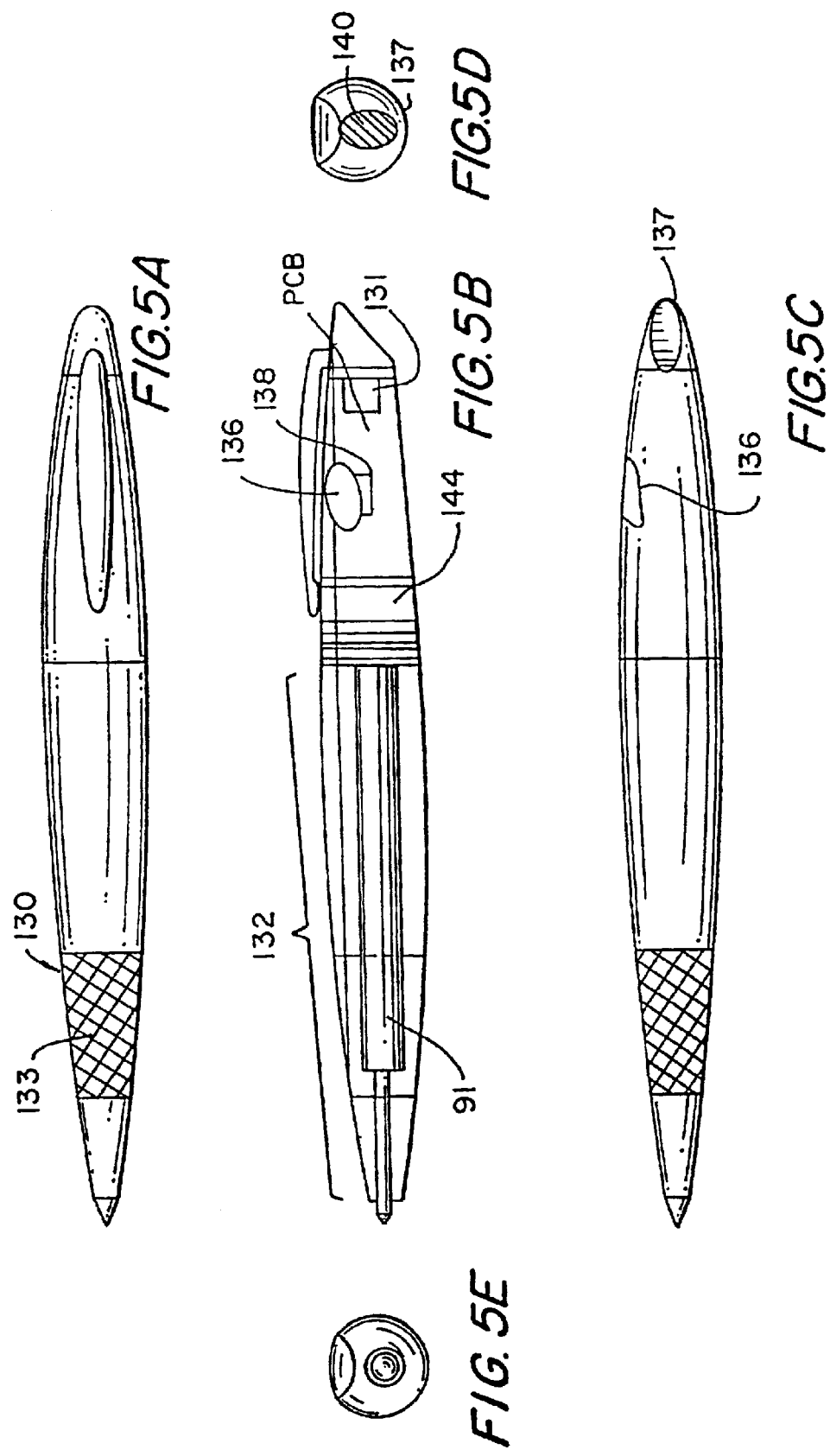

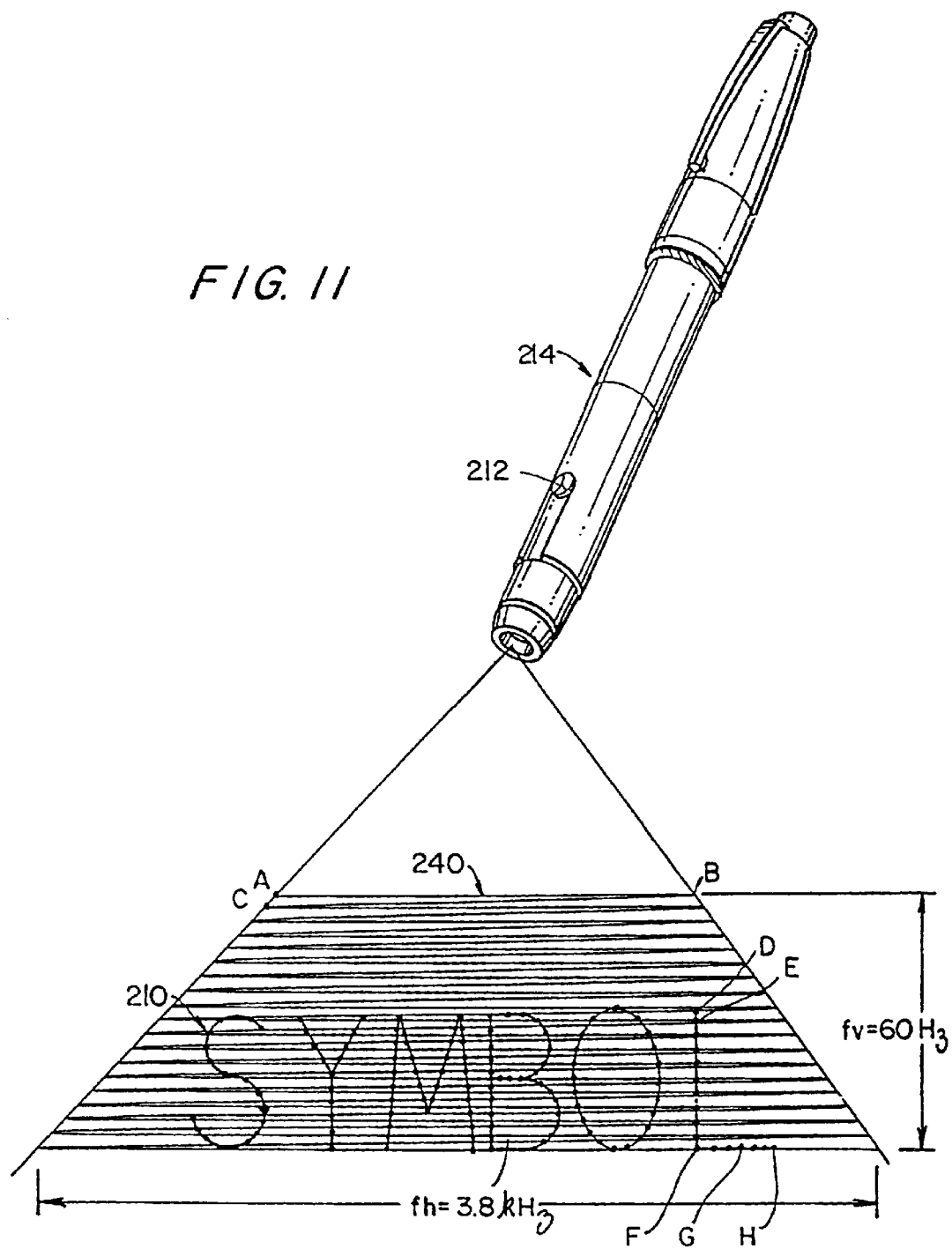

SINGLE DEVICE

VERTICAL SPOT

HORIZONTAL SPOT

LEFT TILT

RIGHT TILT

ELECTRO-OPTICAL ASSEMBLY FOR IMAGE PROJECTION, ESPECIALLY IN PORTABLE INSTRUMENTS

CROSS REFERENCE TO RELATED APPLICATIONS

This application is a continuation-in-part of U.S. patent application Ser. No. 09/604,197, filed Jun. 27, 2000 now U.S. Pat. No. 6,655,597.

BACKGROUND OF THE INVENTION

1. Field of the Invention

The present invention generally relates to an electro-optical assembly for image projection, especially in a portable instrument for projecting an image by controlling a light beam using components employed by readers for electro-optically reading indicia, such as a bar code symbol, a signature, or an image.

2. Description of the Related Art

Various optical scanning systems and readers have been developed heretofore for reading indicia such as bar code symbols appearing on a label or on the surface of an article. The bar code symbol itself is a pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal which is, in turn, decoded into data which represent the information or characters encoded in the indicia that are intended to be descriptive of the article or some characteristic thereof. Such data is typically represented in digital form and utilized as an input to a data processing system for applications in point-of-sale processing, inventory control, distribution, transportation and logistics, and the like.

A variety of scanning systems and readers is known. The scanner could be a wand type reader, such as shown in U.S. Pat. No. 5,508,504, herein incorporated by reference, including an emitter and a detector fixedly mounted in a wand, in which case a user holds and manually moves the wand across the symbol. As the wand passes over the bar code symbol, the emitter and associated optics produce a light spot on the symbol, and the detector senses the light reflected back from the symbol as the light spot passes over the bars and spaces of the symbol.

As illustrated in FIG. 1, a bar code symbol 2 consists of a series of light and dark regions 4, 6 typically in the form of rectangles. The widths of the dark regions 6, the bars, and/or the widths of the light regions 4, the spaces, between the bars indicate the encoded information. A specified number and arrangement of these regions represent a character. Standardized encoding schemes specify the arrangements for each character, the acceptable widths and spacings of the regions, the number of characters a symbol may contain or whether symbol length is variable, etc. The known symbologies include, for example, UPC/EAN, Code 128, Codabar, and Interleaved 2 of 5.

To decode a bar code symbol and extract a legitimate message, a bar code reader illuminates the symbol and senses the light reflected therefrom to detect the widths of the bars and the spaces and produces an electrical signal corresponding to the scanned symbol. This electrical signal is decoded to provide multiple alphanumerical characters which are descriptive of the article to which the symbol is attached or to some characteristic thereof.

The known wand-type reader 8 of FIG. 1 contains an emitter 12 and a detector 14, and the user manually moves the wand across the bar code symbol. The detector 14 senses the light reflected from a spot scanned by the wand 8 across the bar code symbol 2, and produces an electrical signal representing the encoded information to a processor 16. Wands have been disclosed, for example, in U.S. Pat. Nos. 4,654,482, 4,907,264 and 4,937,853.

U.S. Pat. No. 4,471,218 discloses a data wand and a data well, and is incorporated herein by reference. According to this patent, a wand-type data entry terminal is entirely self-contained and cordless, and includes reading and storage circuitry. The terminal further allows downloading of data using an optically coupled link. Preferably, the stored data is output using a pulsed beam from the reading beam light source. The output beam is detected by an optical detector and decoded appropriately.

The disclosures of the above mentioned patents are incorporated herein by reference. The general features of construction and operation of a wand-type reader will be apparent to the skilled reader.

According to another system described in U.S. patent application Ser. No. 08/691,263, filed Aug. 2, 1996, commonly assigned herewith, a hand-held optical reader terminal is provided having an ergonomic design. According to that system, there is provided, inter alia, a hand-held optical reader arranged to fit in the hand of a user and including a reader component and a downloading component. The device can include a display screen for displaying control messages or video images, a keypad for inputting control or other data, and a wireless communication link for downloading data read by the reader component to an external device. The system can further include a plurality of interchangeable data collection modules connectable to the main body of the device, each module fulfilling a different function such as image/video capture, audio capture and so forth. As a result, a simple multi-media module is provided.

It is desired, however, to arrive at a lightweight hand-held data reader having a yet wider range of capabilities. In view of the relative simplicity, availability and adaptability of information systems including bar code symbol data storage capability, it is desirable to develop systems particularly suitable for consumer applications.

Alternatively, an optical moving spot scanner sweeps a light beam, such as a laser beam, across the symbol; and a detector senses reflected light from the beam spot swept across the symbol. In each case, the detector produces an analog scan signal representing the encoded information.

Moving spot scanners of this general type have been disclosed for example, in U.S. Pat. Nos. 4,387,297; 4,409,470; 4,760,248; 4,896,026; 5,015,833; 5,262,627; 5,504,316 and 5,625,483, all of which have been assigned to the same assignee as the instant application and each of which is hereby incorporated by reference. Also incorporated by reference herein are U.S. patent application Ser. No. 09/065,867, filed Apr. 24, 1998 and U.S. patent application Ser. No. 08/353,682, filed Dec. 9, 1994, both of which have been assigned to the same assignee as the instant application. As disclosed in some of the above patents, one embodiment of such a scanning system resides, inter alia, in a hand-held, portable laser scanning device supported by a user, which is configured to allow the user to aim the scanning head of the device, and more particularly, a light beam, at a targeted symbol to be read, as described below in connection with FIG. 1A.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at a target distance. It is often preferred that the cross section of the beam spot measured in the scanning direction at the target distance be approximately the same as the minimum width in the scanning direction between regions of different light reflectivity, i.e., the bars and spaces of the symbol. Although typical readers utilize a single laser source, other bar code readers have been proposed with two or more light sources of different characteristics, e.g., different frequencies.

In the laser beam scanning systems known in the art, a single laser light beam is directed by a lens or other optical components along a light path toward a bar code symbol on a surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan a field of view of a photodetector, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever, et al., describes laser, optical and sensor components mounted on a drive for repetitive reciprocating motion either about an axis or in a plane to effect scanning of the laser beam.

Because of the size and optical and electronic complexity of scanning systems and bar code readers, they generally have heretofore not been combined with other devices in the same housing. The conventional use of a liquid crystal display (LCD) with an adequate viewing size on such readers occupies a large physical area and limits any proposed reduction in size for a hand-held system. The display image is displayed in a single color.

Also known in the art, for example, in U.S. Pat. No. 5,617,304, is a laser pointer which is a device that projects a monochromatic spot of light on a target, such as a presentation being made by a lecturer to an audience. The pointer is essentially a flashlight-type device and is usually packaged in a tubular housing.

Scanning systems for writing or printing indicia have been disclosed, for example, in U.S. Pat. Nos. 4,085,423 and 4,908,813. The use of thermally sensitive paper, or utilizing dyes which are sensitive to radiation in a particular frequency spectrum, is known for use in printing systems, such as exemplified in U.S. Pat. No. 5,014,072.

SUMMARY OF THE INVENTION

OBJECT OF THE INVENTION

Accordingly, it is a general object of this invention to provide a novel electro-optical display, especially of miniature size, for projecting an image of light on a viewing surface.

More particularly, it is an object of the present invention to provide a compact display alternative to liquid crystal display devices, especially in hand-held instruments.

It is yet another object of the present invention to display human-readable information, especially alphanumerical characters, on or off a portable instrument.

A still further object of the present invention is to provide a compact display module useful in many instruments of different form factors.

Still another object of the present invention is to display an image larger than the instrument that contains the assembly for projecting the image.

It is yet still another object of the present invention to provide a display having a wide viewing angle from all directions with high contrast and reduced glare.

A concomitant object of the present invention is to provide an image projector that consumes little electrical power.

FEATURES OF THE INVENTION

In keeping with the above objects and others which will become apparent hereafter, one feature of the present invention generally relates to an arrangement for projecting an image for display. The arrangement includes an energizable, electro-optical assembly including a laser for directing a visible light beam toward a viewing surface when energized, and a scanner for sweeping the light beam along a plurality of scan lines or light paths that extend over the viewing surface; and a controller operatively connected to, and operative for energizing, the laser at selected positions of the light beam on at least one of the scan lines to generate individual light pixels at the selected positions, and at a refresh rate at which the pixels persist to enable a human eye to steadily view the image on the viewing surface.

Preferably, the controller is operative for energizing and de-energizing the laser as the light beam is swept along said at least one of the scan lines. The assembly may include additional light sources for generating additional light beams, all of the light beams having different or the same wavelengths.

The assembly further includes a first scan mirror for sweeping the light beam along a first direction along said at least one of the scan lines, and a second scan mirror for sweeping the light beam along a second direction generally orthogonal to the first direction. The controller is operative for energizing and de-energizing the light source as the light beam is swept along a plurality of each of the scan lines.

In a preferred embodiment, a housing is used for supporting the assembly. The housing has a light-transmissive element through which the swept light beam is directed toward the viewing surface. The housing preferably has a size and a shape configured to be held in a user's hand like a personal digital assistant, or can be mounted around one's wrist like a watch, or the housing may be elongated and extend between opposite end regions in a pen-like configuration. In another example, the housing may have a panel having a front surface to which the swept light beam is directed. The panel may be mounted on the housing for movement to a display position in which the swept light beam is incident on the front surface of the panel.

In another example, the housing has a screen having a rear surface to which the light beam is directed. The screen preferably has an optically diffusive property and is movable to a deployed position in which the swept light beam is incident on the rear surface of the screen and is diffused through the screen to render the image visible on a front surface of the screen. It is also desirable if the screen has a wavelength filtering function to suppress ambient light and increase display contrast.

It is especially advantageous if the first scan mirror is moved at a first rate of speed through a first angular distance, and if the second scan mirror is moved at a second rate of speed slower than said first speed, and through a second angular distance greater than said first angular distance. Also, it is beneficial if the assembly includes a fold mirror in an optical path of the light beam between the first and second scan mirrors.

In accordance with this invention, the controller is operatively connected to a memory having stored fonts and timing data as to when to energize and de-energize the assembly to display the image as font characters. The image is preferably a human-readable message.

A method of projecting and displaying an image also forms part of this invention. The method includes the step of (a) generating visible parts of the image by directing a visible light beam toward a viewing surface, and by sweeping the light beam along a plurality of scan lines that extend over the viewing surface; and the step of (b) generating non-visible parts of the image by preventing the directing step at selected positions of the light beam on at least one of the scan lines. Step (a) is performed by energizing a light source, and step (b) is performed by de-energizing the light source. The sweeping step is performed by sweeping the light beam along two mutually orthogonal directions. Step (a) may be performed by energizing a plurality of light sources, and step (b) may be performed by de-energizing the plurality of light sources.

It is also preferable if step (a) and step (b) are performed in a housing having a light-transmissive element through which the swept light beam is directed. Step (a) is performed either by directing the swept light beam at a front surface of a panel mounted on the housing, or by directing the swept light beam at a rear surface of a diffusive screen mounted on the housing.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows the principal components of a pen-type optical reader;

FIG. 4A shows an alternative version of the pen-type optical reader;

FIG. 4B shows in more detail the principal components of the pen-type optical reader shown in FIG. 4A;

FIG. 5A shows a further alternative pen-type optical reader;

FIG. 5B shows in more detail the principal components of the pen-type optical reader of FIG. 5A;

FIG. 5C is a view of the pen-type optical reader of FIG. 5A from a different angle;

FIG. 5D is an end view of the reader of FIG. 5B;

FIG. 5E is an opposite end view of the reader of FIG. 5B;

FIG. 10 is a schematic view of a drive for moving the focusing lens;

FIG. 11 is a perspective view of a portable instrument during a display mode of operation according to this invention;

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also one or two dimensional graphic patterns, such as signatures as well as alphanumerical characters. In general, the term "indicia" may apply to any type of pattern or information which may be recognized or identified by scanning a light beam and/or a field of view of a photodetector, and detecting reflected or scattered light as a representation of variations in light reflectivity at various points of the pattern or information. A bar code symbol is one example of an "indicia" which the present invention can scan.

Figure 1:
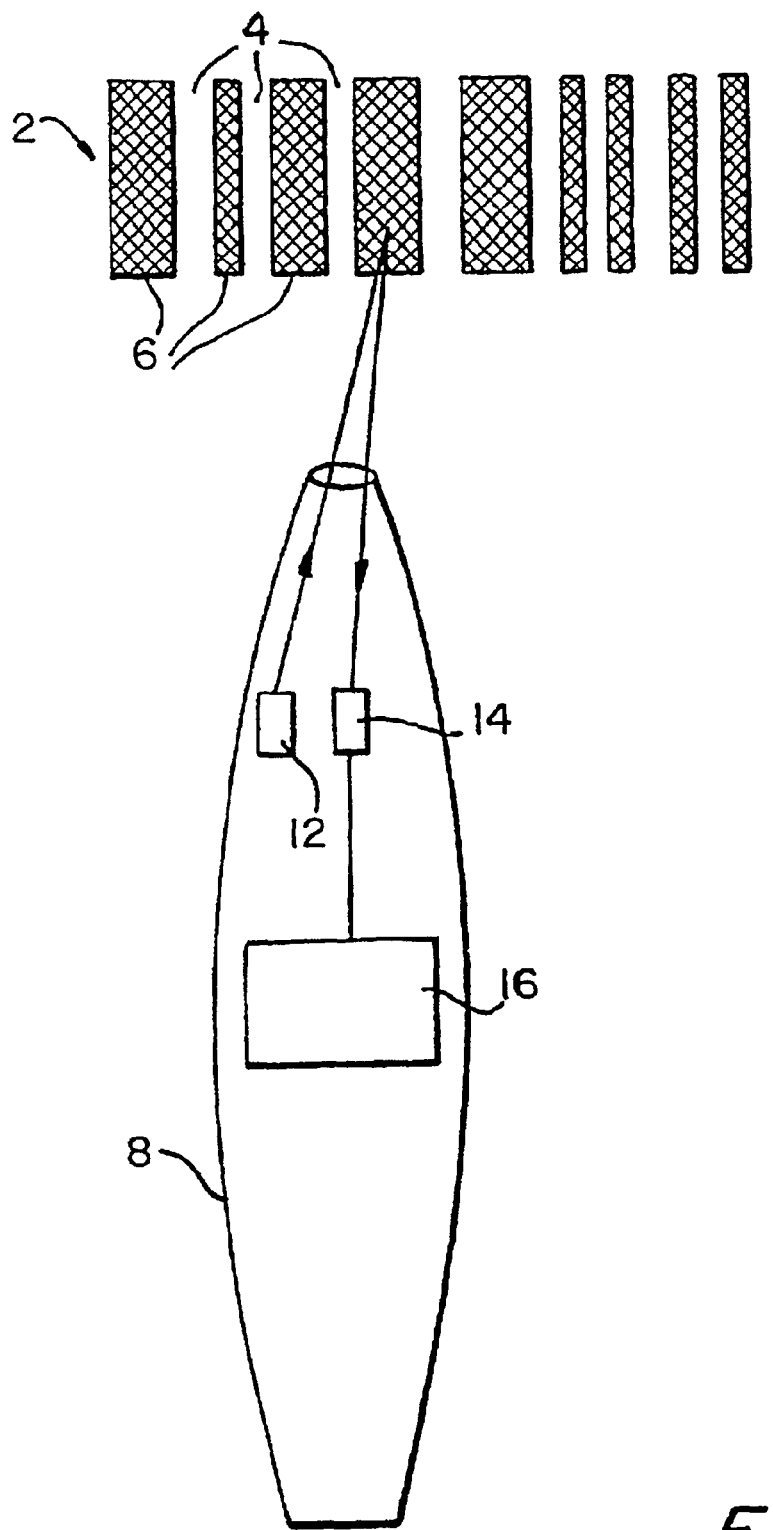
FIG. 1 is a schematic view of a prior art wand-type reader.
Figure 1A:
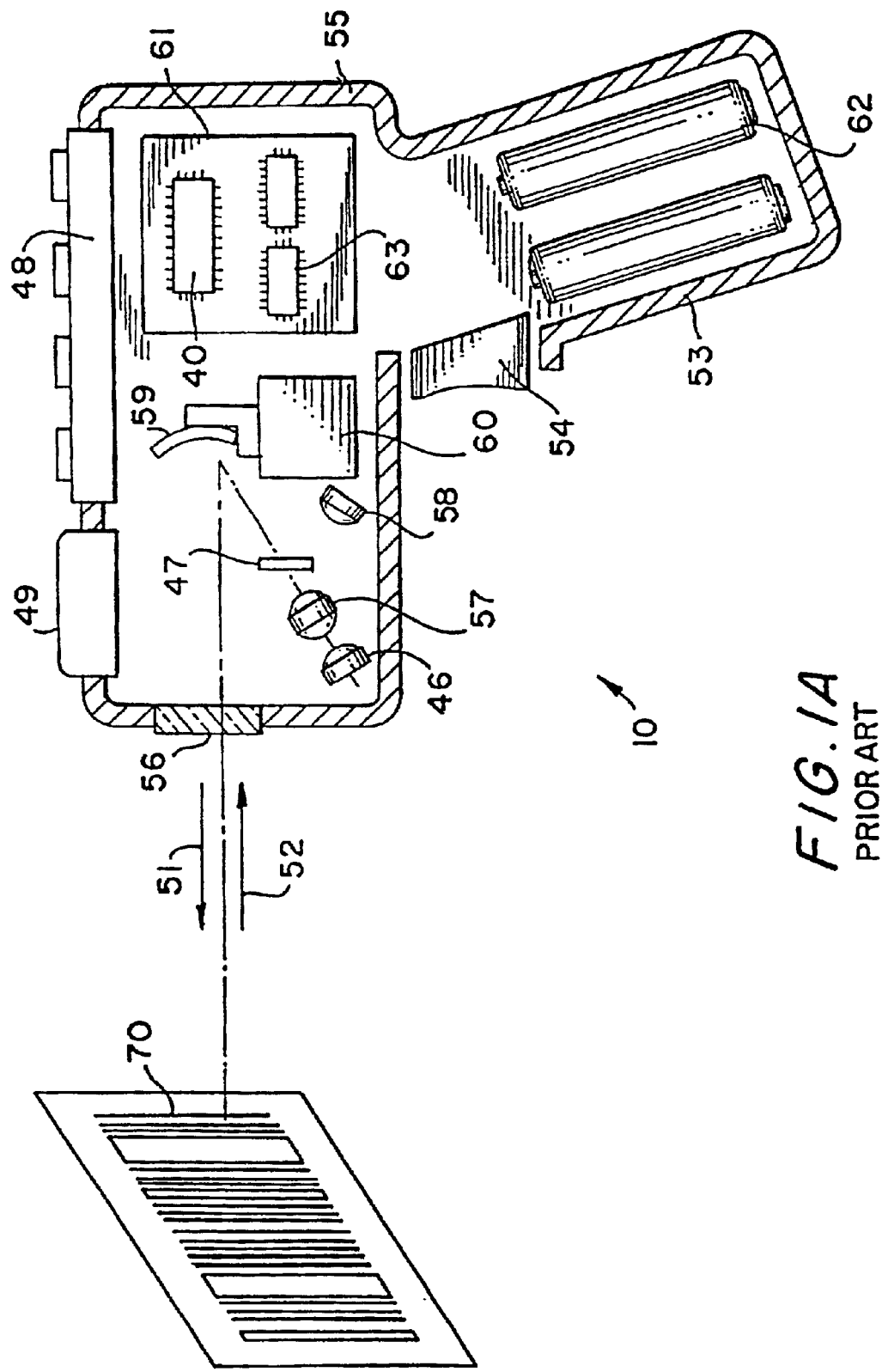
FIG. 1A is a schematic view of a prior art hand-held laser scanner and data collection terminal.

FIG. 1A illustrates an example of a prior art bar code symbol reader 10 implemented as a gun shaped device, having a pistol-grip type of handle 53. A lightweight plastic housing 55 contains a light source 46, a detector 58, optics 57, signal processing circuitry 63, a programmed microprocessor 40, and a power source or battery 62. A light-transmissive element or window 56 at the front end of the housing 55 allows an outgoing light beam 51 to exit and an incoming reflected light 52 to enter. A user aims the reader 10 at a bar code symbol 70 from a position in which the reader 10 is spaced from the symbol, i.e., not touching the symbol or moving across the symbol.

As further depicted in FIG. 1A, the optics may include a suitable lens 57 (or multiple lens system) to focus the scanned beam into a scanning spot at an appropriate reference plane. The light source 46, such as a semiconductor laser diode, introduces a light beam into an optical axis of the lens 57, and the beam passes through a partially-silvered mirror 47 and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

The light 52 reflected back by the symbol 70 passes back through the window 56 for transmission to the detector 58. In the exemplary reader 10 shown in FIG. 1A, the reflected light reflects off of mirror 59 and partially-silvered mirror 47 and impinges on the light sensitive detector 58. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spaces between the bars. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyzes the widths of the bars and spaces to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as auto-discrimination.

To scan the symbol 70, the user aims the bar code reader 10 and operates movable trigger switch 54 to activate the light source 46, the scanning motor 60 and the signal processing circuitry. If the scanning light beam 51 is visible, the operator can see a scan pattern on the surface on which the symbol appears and adjust the aiming of the reader 10 accordingly. If the light beam 51 produced by the source 46 is marginally visible, an aiming light may be included. The aiming light, if needed, produces a visible light spot which may be fixed, or scanned just like the laser beam 51. The user employs this visible light to aim the reader at the symbol before pulling the trigger.

The reader 10 may also function as a portable data collection terminal. If so, the reader 10 would include a keyboard 48 and a display 49, such as described in the previously noted U.S. Pat. No. 4,409,470.

Figure 1B:
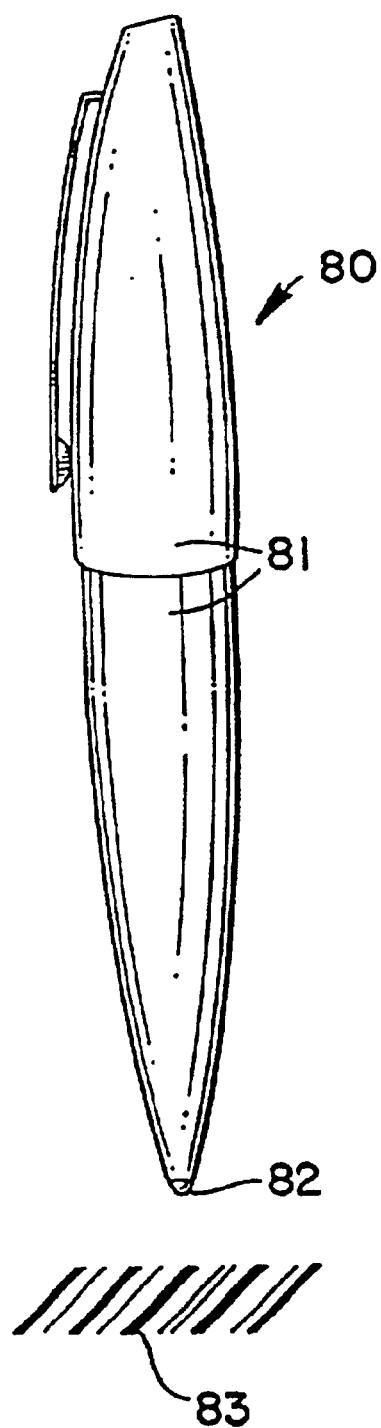
FIG. 1B shows a hand-held pen-type optical reader.

In view of the relative simplicity, availability and adaptability of information systems including bar code symbol data storage capability, it is desirable to develop systems particularly suitable for consumer applications. An optical reader which has many consumer applications is shown in FIG. 1B. The arrangement, generally designated as 80, comprises a pen-shaped main body 81 having at its writing end an optical scanner element light emitter and detector 82 for reading a bar code symbol illustrated schematically as 83. The pen may also include actual writing capability, for example by having the writing nib adjacent the optical element 82 or, indeed, having the writing element and the optical element 82 at opposing ends. It is desired to increase the range of applications for such a product. The data processing capabilities of such a system 80 are limited by its physical size and power supply potential consequently limiting the range of applications of the arrangement. In addition, various problems arise in actual operation of such a system, in particular in regulating the varying speeds at which consumers can scan a given bar code symbol 83.

An embodiment of an optical reader to be used in conjunction with the present invention is shown in FIG. 2. Although a pen-type optical reader (often known as a "data wand") is shown, it will be appreciated that any other hand-held configuration would be appropriate for use in conjunction with the present invention. Although specific constructional details are also discussed in more detail below, it will be appreciated that data storage/processing elements and optical reader elements of known type can replace the specific components discussed in a manner that would be well known to the skilled person. A discussion of pen-type readers is found in U.S. Pat. No. 5,506,392, commonly assigned herewith and incorporated herein by reference.

The pen-type optical reader (henceforth referred to as a "pen or wand reader") is generally referenced 90 in FIG. 2. It will be appreciated that the exact shape of the pen reader as illustrated may be exaggerated, for example in width, in order to show more clearly each of the principal components and how they interact. In the embodiment shown, the pen reader 90 comprises a ballpoint pen 91, 92 together with the optical reader 93 itself. The pen reader need not actually have writing capability, or may be in the form of any suitable writing implement such as a pencil, a fountain pen, a marker pen and so forth. Indeed, the optical reader sub-system discussed in more detail below can be in a modular form insertable into a suitably configured writing implement housing of any desired type.

The writing element of the pen reader 90 is shown schematically as a ball-point pen cartridge 91 together with a projection/retraction mechanism generally designated 92 and of any suitable known type. Evidently it is desirable to reduce the size of those elements 91, 92 as far as possible to allow maximum space for the reader module.

The reader module is generally designated 93. The components and construction of the module 93 will be generally well known to the skilled person and are described only briefly hereafter for the purposes of completeness. The reader module 93 includes a light source 94, for example, a laser or LED and a reflector 95. A reading beam generated by the light source 94 is reflected by the reflector 95 out of a reading element or window 96. The reading beam is reflected by a bar code symbol generally designated as 97, and the reflected light passes through the reading window 96 and is received by a detector 98. The reader module 93 may be a field of view reader in which case the mirror 95 is a fixed mirror and the detector 98 comprises a CCD (charge coupled device) array, or a scanning system, in which case, the reflector 95 is driven by a motor schematically shown at 99 for scanning motion. The light source 94, detector 95 and, if appropriate, motor 99 are connected to a processor, control and data storage element 100 in conjunction with a power source 101. The processor element 100 controls operation of the various components and also acts as a data storage and processing device for bar code information read by the module 93. As discussed in more detail below, it is desired to download the information stored in processor element 100 at a later stage to an external device. Accordingly, a data output port is provided and is fed by line 102, preferably adjacent to or in conjunction with the reading window 96. The wand reader 90 may also be used as a laser pointer in one embodiment, wherein the output reading beam is used to highlight desired elements during a presentation by projecting a beam spot on the presentation.

A particular implementation proposed according to the present invention for the pen reader 90 occurs in relation to consumer information access. For example, where a consumer carries a pen reader 90 and is reading a printed publication including advertisements, the text of the advertisements may not contain sufficient information concerning the product advertised, nor, of course, can the advertisements act as any more than encouragement for the consumer to purchase the product should the consumer subsequently encounter the product, introducing the risk that the consumer may forget about the product.

Figure 3:
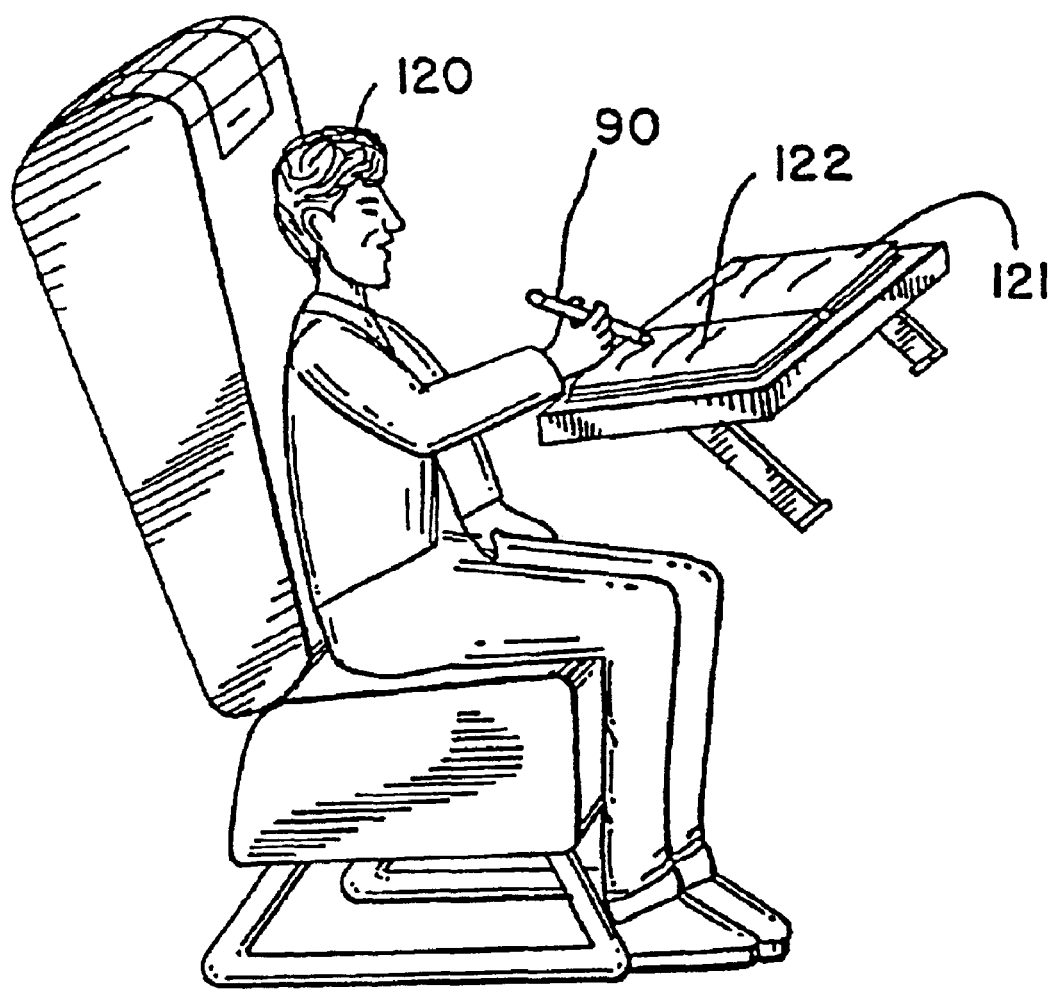
FIG. 3 demonstrates one use of the pen-type optical reader.

Where, as in FIG. 3, the advertisement carries a bar code symbol 122, however, many of these problems can be rectified for a consumer 120 carrying a pen reader 90 of the type shown in FIG. 2. When an advertisement, for example, in a magazine 121 is of interest to the consumer 120, the consumer simply scans the corresponding bar code symbol 122 with the reader pen 90. The bar code information is stored in the processing element 100 and, to the extent desired, processed. In particular, information contained in the bar code symbol 122 relating to the advertised product is stored. As a result, the consumer has an automatic reminder of the product he wishes to purchase as well as information relating to the product. Evidently, where the consumer 120 sees more than one product of interest, the relevant information can also be stored, the storage capabilities of the reader pen 90 being limited only by the storage space in the processor element 100.

Figure 3A:
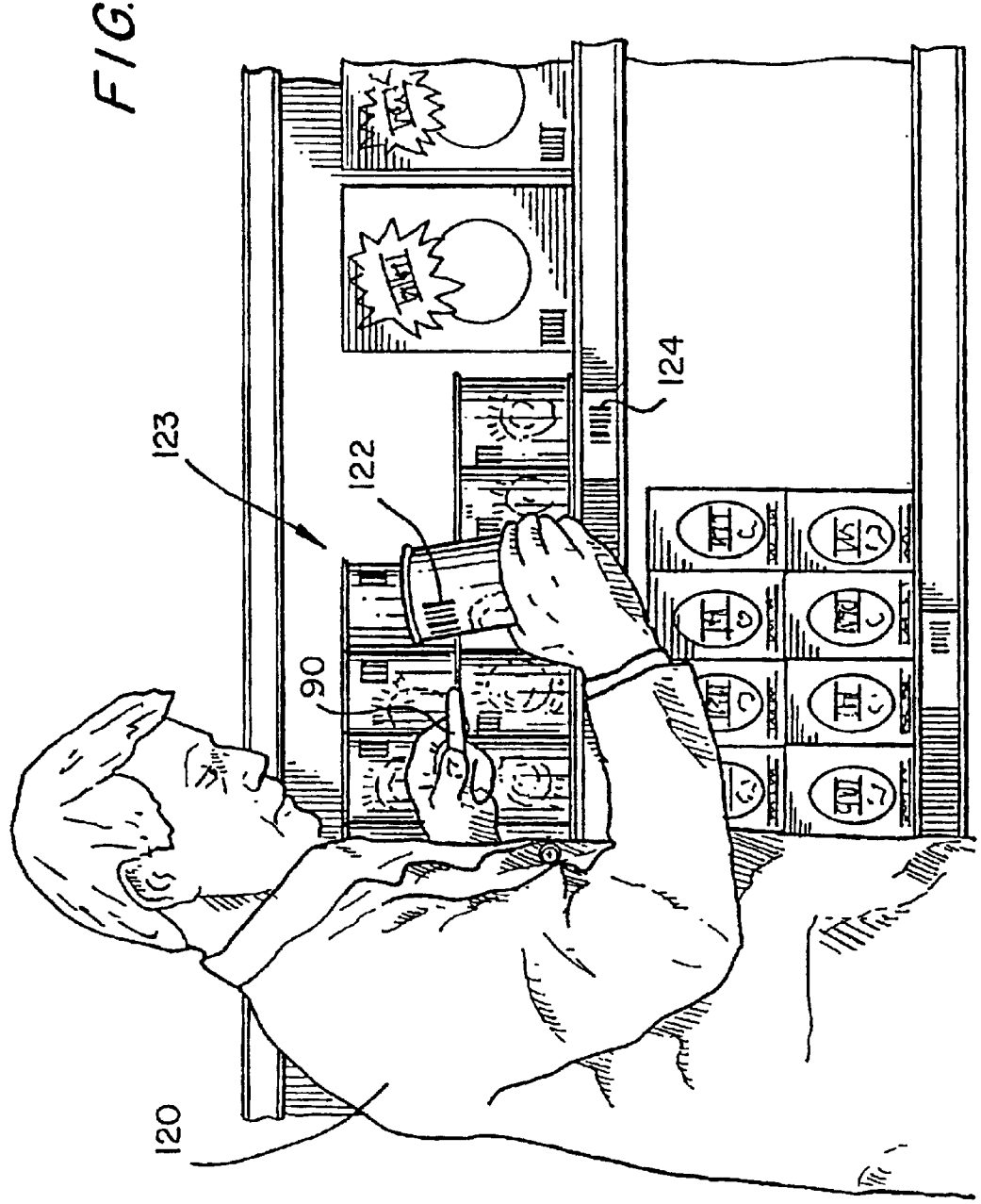
FIG. 3A demonstrates another use of the pen-type optical reader.

Another example is shown in FIG. 3A where the consumer 120 carries the wand reader 90 in a retail outlet selling products 123. Each of those products may carry a bar code symbol 122, for example, in UPC format, or a symbol 124 may be mounted on a shelf. The consumer 120 may be interested in purchasing the product 123 but may not be willing to commit until further information is available. There exists, therefore, a risk that the consumer will forget about the product or, as previously, it may be necessary to rely on the consumer 120 chancing upon the product or additional information relating to the product, and his memory being jogged accordingly.

A particular implementation of the present invention allows the consumer to subsequently download the information stored in the reader pen 90 in a manner described in more detail below. In particular the information can be downloaded to a personal computer or other access point to a computer or data network. The downloaded information can then be used in various different manners. For example, the product can be ordered or additional information concerning the product can be accessed. A particular implementation proposed under the present invention is that the bar code symbol accompanying the advertisement contains sufficient information for the personal computer or access point to the computer network to access a site on the Internet (or comparable data storage system). This site can contain additional information concerning the advertised product, information concerning related products, price information, cross-references to further related sites, and the capability of ordering and paying for the product. This greatly simplifies the purchasing process and also ensures that the consumer does not forget a product which has caught his attention.

In addition, further information can be derived according to the present invention. For example, the impact of the advertisement and popularity of the product can be assessed for future marketing purposes, and quantifying the amount of printing space that should be assigned to the advertisement based on its popularity. Preferably, the reader pen 90 has a dedicated user and carries user identification information such as a credit card number, or other identification carried under an approved system. The other identification is identical for each download, thereby insuring that the downloaded information is matched to the pen. As a result, during purchase of the product, details of the transaction can be based on that information. In addition, a customer profile can be built up based on the consumers buying patterns.

The access point can be located within the retail outlet allowing the consumer 120 to access the information on site and make a purchase decision before leaving the retail outlet. Suitable access points are discussed in more detail below. It will be seen that the bar code symbol can be carried on the product, or as shown at 124 on the shelf adjacent the product. Alternatively, the products could be displayed graphically on a chart and the bar code symbol shown on or adjacent the product on the chart.

It will be seen that the system can be extended to other applications. For example, where an abstract of text is printed together with a bar code symbol, the bar code symbol can contain information which, when downloaded, can provide access to additional or related text. Assuming high enough resolution, the bar code symbol can even be read off a VDU or other visual display system in a closed system in order to access additional information on the Internet. The bar code symbol can follow any appropriate protocol, for example UPC or EAN and is translatable into the Internet Universal Resource Locator (URL).

Figure 3B:
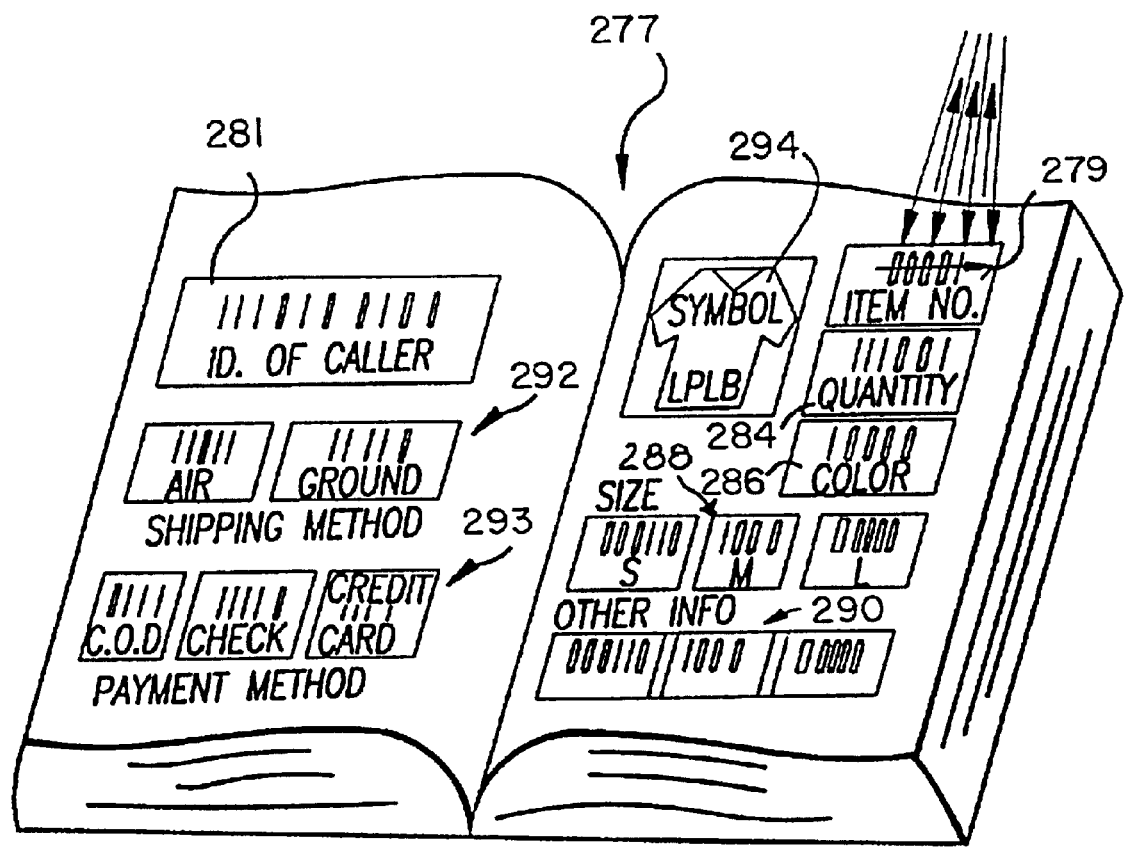
FIG. 3B demonstrates still another use of the pen-type optical reader.

A further application for the system is described with reference to FIG. 3B. A catalog 277 shows a product 294 and also includes various data relating to the item number 279, the quantity 284, the color 286, the size 288 and other information 290 relating to the product. In addition, bar coded shipping information is stored at 292 and payment method is stored at 293. Such a catalog is of use, for example, in home shopping applications. The catalog can also carry a bar code identifying the caller at 281 which information can be used for consumer identification at the purchasing stage. The particular implementation according to the present invention requires suitable downloadable product information to be stored in the bar code symbols. In particular, the item number 279 can in fact be in the form of a suitable computer network site address. Alternatively, the computer network site address can be stored at the other information field 290. The remaining bar code symbols may not be required, as the information can be stored at the site address, but the embodiment shown allows alternative implementations dependent upon the hardware available to the user.

The user scans the wand reader across the site address field and, if necessary, across the caller identity field 281 and downloads the stored information to an Internet (or other computer network) access point. The remaining product information is available at the Internet site and the options such as quantity, color, size, shipping method and payment method can be input at that stage. Accordingly, a simple catalog-based home shopping system can be set up. It will be appreciated that such a system can be introduced in various environments, for example, when a passenger is on an airplane, a suitable catalog can be provided. Once again, the system allows consumers to consider carefully what products they should buy on the basis of all available information, and also provides a useful prompt or reminder concerning products which have caught the consumer's eye to which the consumer is not yet committed.

Where the bar code symbol is for use in conjunction with the Internet or parallel system, the information contained in the bar code symbol effectively comprises an Internet address. When that information is downloaded to a personal computer, the personal computer communicates with a dedicated server which captures the Internet address and user identification information and re-routes to the advertiser's web site for information retrieval and delivery to the consumers personal computer. Accordingly, the downloaded information would enable the consumer to go directly to a relevant home page or a relevant sub-page. A resolution server on the system could be used to collect information from all users, not only for information purposes but also for billing and routing purposes.

It will be recognized that alternative systems to the Internet, and alternative access methods are envisaged. For example, the Internet could be replaced by an Intranet or a local area network (LAN), accessible by a limited number of users restricted either geographically or by some form of access authorization. Instead of being downloadable to a personal computer which processes the site address information, pulls up the authorization site and displays the product information, alternative access points are envisaged. For example, following a system such as the Citrix (TM) system, the downloading could be merely an access point or terminal with minimum processing capabilities itself. The terminal transfers the site address information to a host computer which carries out the principal conversion to a URL, accesses the web site and transfers the information back to the terminal for display. In that case, the terminal acts as little more than a display and input/output device. It is envisaged, therefore, that the system could embrace the new generation "network computers" working on this principle. The effect of such a system is a considerable change in the architecture of the system, allowing reduced costs to the consumer who need only buy the low level terminal for connection with a host computer linked into the main network. As a result, the proposed invention is yet further desirable and accessible to the consumer.

Various alternative pen reader configurations are shown in FIGS. 4A–B and 5A–E. Referring firstly to FIGS. 4A and 4B, a reader pen 130 includes a pen assembly 132 including a ball pen cartridge, for example, of the type sold under the trade mark Zebra F-refill and an actuating mechanism 134 of a known type rotatable to extend and retract the ball pen cartridge. The pen reader 130 further includes a trigger 136 manually actuatable to enable a scan together with a cooperating internal switch 138, for example, model number ITT KSC 421. The reader pen 130 includes a wand tip 140 for reading a bar code symbol. A data output port is also provided at 137. The system is powered by a battery 142 of any suitable compact type. Also included is a beeper 144 or other audible device which can sound to indicate to the user that a bar code symbol has been successfully read, that the battery power is low, that there is little memory space left and so forth. Different audible tones or sequences of audible tones can represent different warning signals. In addition, the pen reader 130 can include a screen, or other visual indicator carrying information as to the status of the pen reader and any instructions for use thereof. Preferably, the visual indicator is situated to be visible to the user when the pen reader is held during use.

FIGS. 5A to 5E show a slight variant in which, where appropriate, the same reference numerals have been used as for FIG. 4. It will be seen that the exit window for the reader (here shown as a laser scanner at 131) is in an inclined face relative to the longitudinal axis of the reader pen 130, allowing improved ergonomics in reading a bar code symbol. The reader further includes a grip 133, for example made of leather, around a portion of its length allowing improved user grip and comfort.

Figure 6:
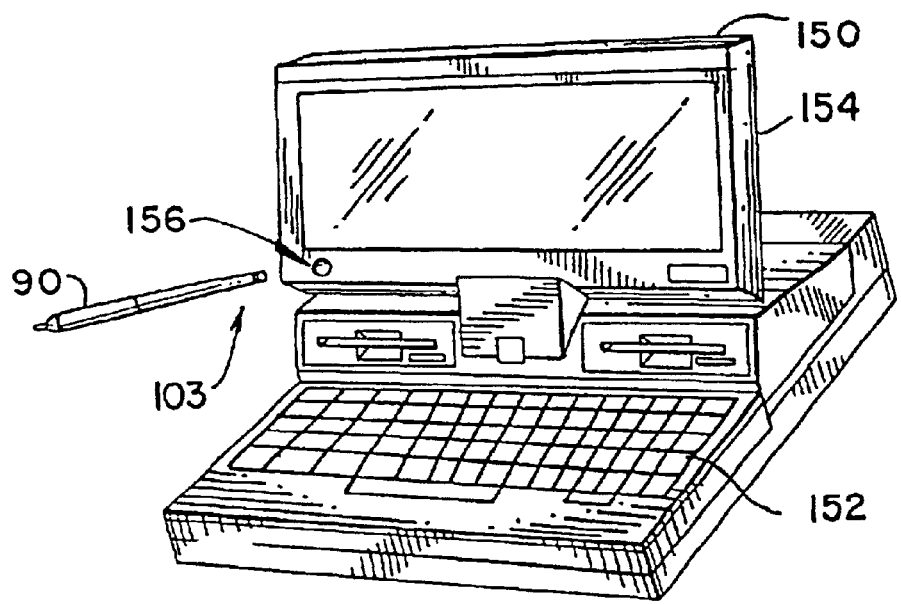
FIG. 6 shows one method of downloading information from a pen-type optical reader.
Figure 7:
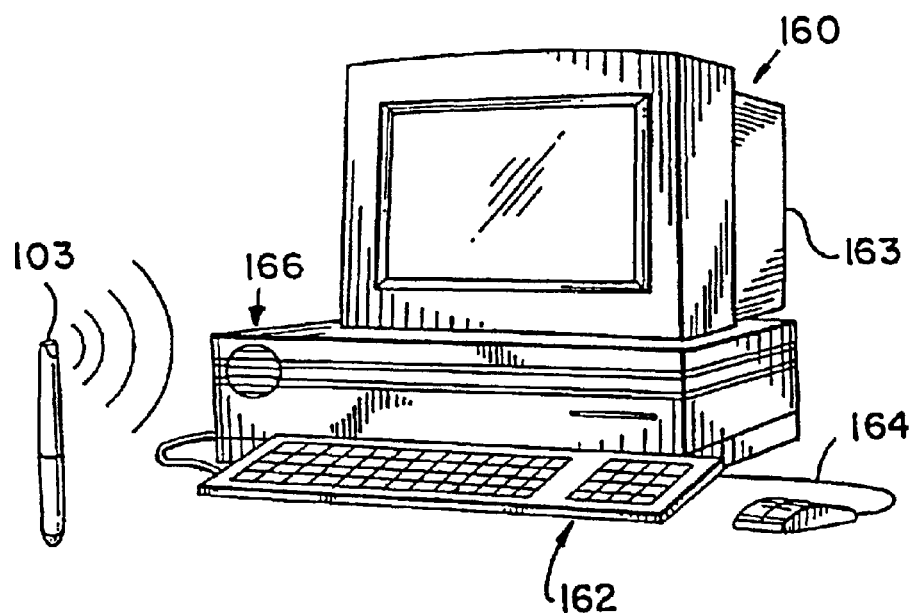
FIG. 7 shown an alternative method of downloading information from the pen-type optical reader.

Various methods of downloading the information are contemplated. Two approaches are shown in FIGS. 6 and 7. In a preferred configuration shown in FIG. 6, a personal computer is shown at 150 being of the portable type although a fixed type computer will also, of course, suffice. The personal computer 150 includes a keyboard 152 and a screen 154 and can generally be of conventional type. The personal computer 150 includes a data input port 156 arranged to communicate with the pen reader data output port 103. In the embodiment shown, the output port 103 of the pen reader 90 is touched against the data input port 156 on the personal computer 150. Touching the input port 156 firstly commences the downloading sequence and secondly allows accurate and rapid communication between the pen reader 90 and the personal computer 150. The interface between the pen reader data output port 103 and the data input port 156 can, for example, be of the "memory button" or "touch memory" type, for example, as sold by Dallas Semiconductors. The actual interface is of well known type and, in effect, the information stored in the pen reader 90 is communicated to the port 103 provided at an appropriate point on the pen reader 90. The information is converted to a suitable form for transmission at the port 103 and, on contact with the data input port 156 of the personal computer 150, the transmission is activated. The data input port 156 is configured to receive and convert into a suitable form information transferred from the port 103. In particular, the information can be transferred in the form of a series of electronic pulses representing bits. Such a system gives rise to a simple and substantially error-free interface allowing a user to download information stored in a reader pen 90 to a personal computer 150 quickly and accurately.

As will be appreciated, various other downloading methods are contemplated within the ambit of the present invention. For example as shown in FIG. 7, a fixed-type personal computer 160 including a keyboard 162, a display screen 163 and a mouse 164 includes a microphone 166 which receives an audio signal from a corresponding speaker data output 168 on a reader pen 90. A button (not shown) or other switch can be included on the reader pen 90 to activate transmission by the speaker 168. The information stored in the reader pen 90 is converted to a high frequency audio signal at the speaker 168 which is received by the microphone 166 and decoded. Of course, the transmitter can transmit other forms of radiation, for example, it can be an optical or microwave transmitter with a suitable receiver being provided on the personal computer.

Where the transmitter is optically based, it can utilize IRDA (infrared) standard communications implementation as will be known to the skilled person and as currently available on many "laptop" computers. The optical transmission can be at the "blink" (repetition) frequency of the pen illumination source.

Figure 8:
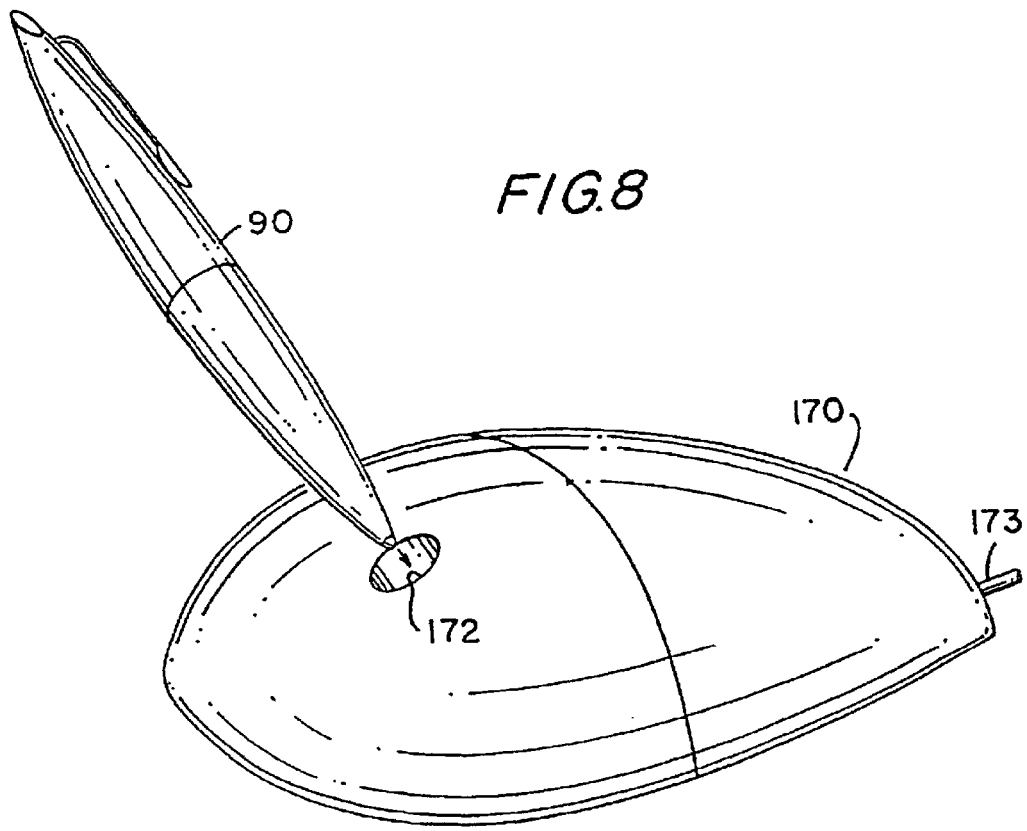
FIG. 8 shows a dedicated downloading port from the pen-type optical reader.

Yet a further downloading system is shown in FIG. 8. A dedicated data downloading port 170 includes an orifice 172 for receiving a reader pen 90. The port 170 communicates information downloaded from the pen reader 90 via a line 174. Referring to the sectional view shown in FIG. 9, it will be seen that the port 170 includes a data receiving interface 174 of any of the types described above which communicates with the reader pen 90 for downloading of information. Downloading can be contact activated by contact between the pen reader 90 and the interface 174, or activated by pushing a button or other switch (not shown) on the pen reader. The interface 174 communicates with a processor 176 for converting the downloaded information, if necessary, into a format appropriate for a computer network, and the information is communicated to the computer network via line 173. It will be appreciated that line 173 can comprise a wireless link or a telephone line, in which case an appropriate modem can form part of the port 170.

Figure 9:
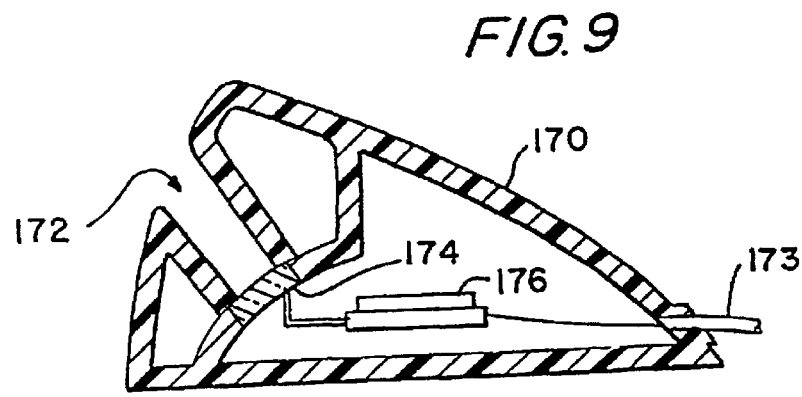
FIG. 9 is a sectional view of the downloading port shown in FIG. 8.

It will be seen that all of these methods comprise a user-friendly system for downloading scanned information from a pen reader. Use of a port of the type shown in FIGS. 8 and 9 is particularly suitable where it is not desired to rely on the consumer having a computer or other home access to a suitable computer network. The port can, for example, be provided at a retail outlet or other point of sale. It should be noted that the pen reader can also be writable via the data port, personal computer or other means (even a bar code symbol itself) to input user information of the type discussed above. This would facilitate short term usage of a pen reader allowing a given user to input information temporarily for the duration of his or her use of the pen reader.

The range of applications of the system as a whole is evidently very wide. For example, a consumer could use the pen reader while on an airplane or in other areas where access to the Internet is not immediately available. In addition to advertisements and editorial text of the type described above, the system could be used to store and access information concerning items in many other applications, for example, in warehouse storage systems.

Turning once again to the wand reader itself, it will be seen that a problem that arises in use is that the user may swipe or scan the wand reader across a bar code symbol at a non-constant speed. This will particularly be a problem for a fixed field of view reader as the width of a bar read by the reader in the time domain will be dependent upon the speed at which the reader is swiped. This is exacerbated if the wand reader is not scanned at a constant speed as will often be the case with inexperienced users.

Various methods can be used to overcome this problem. For example, the wand reader can be designed for contact with a page or surface on which the bar code symbol is printed. In that case, a roller element can be incorporated at the tip of the wand reader. The roller, as it rolls across the paper while the bar code symbol is being read, records the instantaneous velocity of the wand reader across the paper at any point. The bar code symbol as read in the time domain by the wand reader can thus be accurately decoded, and the actual spatial widths of the bars and spacers can be calculated from the product of the time taken to traverse a given bar or space and the speed of the wand reader while traversing the bar or space. A similar calculation can be used in an alternative system where, instead of a tip roller, a bar code symbol having a reference line of dots or lines running parallel with the bar code symbol itself and having a known spacing is provided. The speed of the wand reader can, therefore, be determined from the time taken to traverse adjacent points in the reference line and calculating the instantaneous velocity based on the known distance between the points.

It will be appreciated, however, that it is desired to be able to cater for user determined scanning speed, or variations in scanning speed, without requiring the additional parts and complexity of a roller system, and without requiring the bar code to include a reference line when printed.

Figure 18:
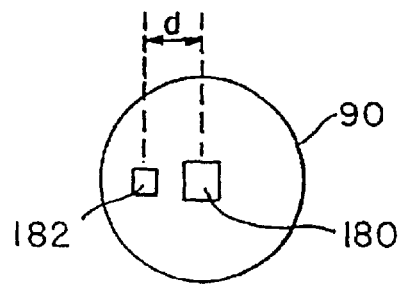
FIG. 18 is a front-end view of a pen-type optical reader including a scanning speed sensor.
Figure 19A:
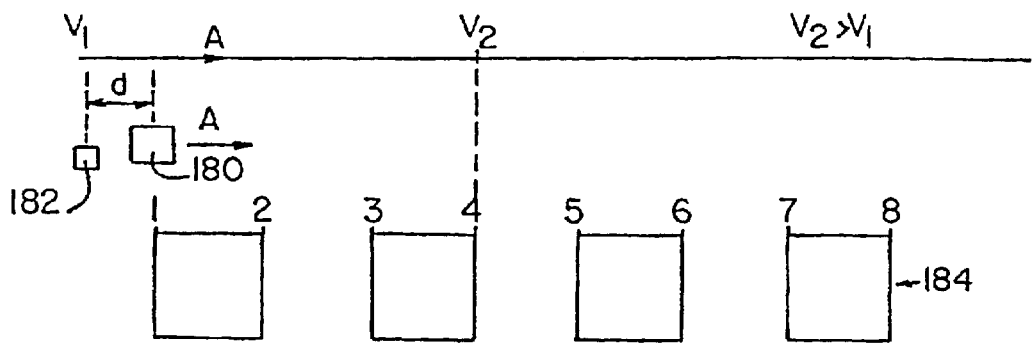
FIG. 19A shows an exemplary bar code symbol to be scanned.
Figure 19B:
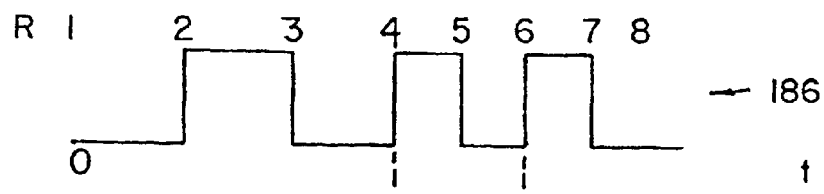
FIG. 19B shows the detected reading by a principal sensor.
Figure 19C:
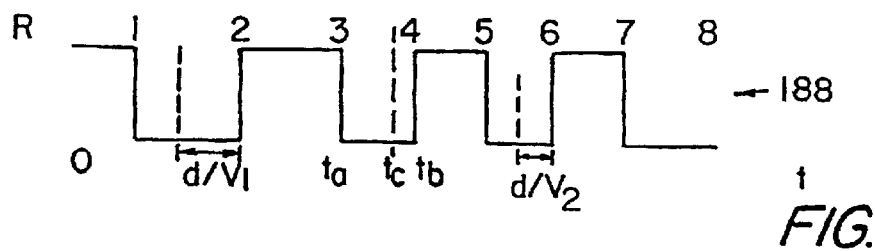
FIG. 19C shows a detected reading by a subsidiary sensor.

A wand reader adapted to overcome these problems is shown in FIG. 18. As seen from a view of its scanning end, the wand reader 90 includes a principal reader point 180 and a second reading point 182. The reading points 180, 182 are separated by a known distance d. Referring to FIGS. 19A through 19C, when a bar code symbol having for the purposes of illustration the simple configuration shown at 184 is read by the wand reader, the reflectivity readings in the time domain taken by each of the reader points 180, 182 are shown at 186, 188, respectively. The time lag between the readings 186, 188 resulting from the spacing between the reading points 180, 182 is evident. Readings 186, 188 are scaled in the time domain to match the spacing in the bar code symbol 184 at a first speed $V_1$ for the purposes of clarity.

The wand reader 90 is scanned across the bar code symbol 184 in the direction shown by arrow A. The transition points between bars and spaces on the bar code symbol 184 are numbered 1, 2, 3 . . . 8. As an illustrative example, the wand reader 90 is scanned at a first speed $V_1$ across points 1, 2 and 3 but, at point 4, the scanning speed changes to $V_2$ where, again for the purposes of illustration, $V_2 > V_1$.

The spaced reading points 180, 182 are shown in their relative positions traversing bar code symbol 184. The reflectivity reading for the principal reading point 180, which traverses the bar code first, is shown at 186. As will be seen, the duration between each of the transition points 1, 2, 3, 4 is constant corresponding to constant speed $V_1$. The duration across transition points 4, 5, 6, 7 is also constant but shorter than that for transition points 1, 2, 3, 4 because the wand reader is scanned across the symbol 184 at a higher speed $V_2$.

In order to obtain additional information, it will be seen that the reflectivity reading for the second reading point 182 is also required. The reflectivity reading 188 for the second point 182 also displays constant duration between transition points 1, 2, 3 but lags in time behind the reading 186 for the principal point 180 because the second point 182 is physically behind the main point 180, spaced by distance d. The time lag is given by the equation $d/V_1$. Accordingly, as d is a known constant and the time lag can be calculated from a comparison of the two readings 186, 188, $V_1$ can be calculated simply. It will be seen that, in order to carry out the calculation, it is necessary to be able to match up corresponding points on each of the readings 186, 188. After that, of course, assuming no reading errors, the subsequent transition points can be easily matched. Indeed, where there is no change in speed during the scan, no further calculation is required. The time lags between subsequent corresponding points on each reading 186, 188 can be checked to verify that the speed remains constant.

Further calculation steps are required if it transpires that the speed changes during the scan. For example, where, as the principal reading point passes transition point 4 on the bar code symbol 184, the speed increases to $V_2$, the duration between adjacent transition points will decrease for each reading 186, 188. If the time lag between corresponding transition points subsequent to the change of speed is measured, once again the new speed can be established, given that the time lag=$d/V_2$ (as shown for transition point 6).

Figure 19D:
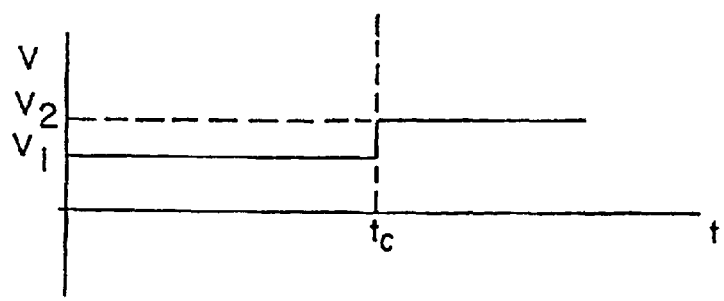
FIG. 19D is a graph showing scanning speed variation against time.

It will be appreciated that to obtain the most information, it is desirable to know the point in time at which the speed changes. In the example shown, comparison of the respective durations between corresponding adjacent transition points on each of the readings 186, 188 shows that the speed change must have occurred while the second reading point 182 was between transition points 3 and 4, as the time taken for the second reading point 182 to traverse the points is shorter than that for the principal reading point 180. In fact, the exact point in time can be calculated, referring to reading 188, using the following equation where to is the point at which the velocity changes:

$$(t_c - t_a) \Box V_1 + (t_b - t_c) \Box V_2 = t_b - t_a$$

$$t_c = \frac{t_a(V_1 - 1) + t_b(1 - V_2)}{(V_1 - V_2)}$$

where $t_a$ is the time at transition point 3 and $t_b$ is the time at transition point 4, and $V_1$ and $V_2$ are calculated as described above. It will be seen, therefore, that the speed against time diagram shown in FIG. 19D can be constructed. This allows accurate calculation of the actual spacing of the various transition points of the bar code symbol 184 in conjunction with the reading 186 taken by the principal reading point 180.

Figure 20:
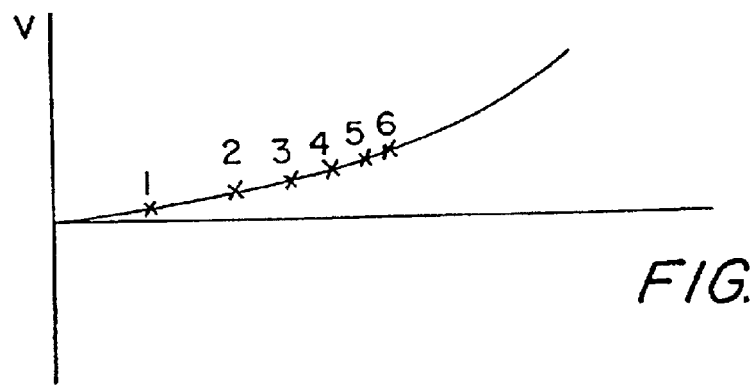
FIG. 20 shows an alternative graph of scanning speed variation against time.

It will be appreciated that the above discussion draws a useful guideline based on a rather idealized velocity variation. In practice, of course, it is likely that the speed will vary as some form of continuous curve. In that case, the maximum information that can be obtained will be from measuring the time lag between the two reading points 180, 182 passing each transition point. The speed at each transition point can thus be determined, taking into account the known spacing between the reading points 180, 182 as discussed above. This will give rise to a discrete set of measured velocity values for given times t as illustrated in FIG. 20. The transition point corresponding to each measurement point is numbered 1, 2, 3 . . . corresponding to the numbering in FIGS. 19A–19D. It will be seen that, in the illustrated example, the speed plot curves upwardly indicating acceleration. The points at which the readings are plotted along the time axis will move closer together as the scanning speed increases.

The instantaneous speed information can only be derived for each of the recognizable transition points. If desired, or possible, recognizable printing defects detected in each of the readings 186, 188 could be used to provide extra measurement points.

Two principal difficulties are identified with the system and solved as discussed below.

Firstly, information as to the instantaneous speed between transition points cannot be determined exactly. However, a curve can be extrapolated between the measurement points which will give an accurate indication of the scanning speed of the wand reader at any point in time. The extrapolation process can be improved taking into account information stored as to typical scanning speed curves for users. This information could be used to determine the most likely curve followed between determined measurement points.

In addition, variations in scanning speed in the period between each of the reading points passing the same transition point will not be detected. Accordingly, the speed measured at each transition point can be no more than an average value. This is most simply overcome by ensuring that the spacing between the points 180, 182 is as small as possible such that only a very short lag period is available in which the scanning speed can change.

A further factor that must be taken into account is that the orientation of the wand reader will influence the readings and calculations. In particular, the spacing between the reading points 180, 182 in the scanning direction will depend on the orientation of the wand reader. Various possibilities are available to overcome this problem. First of all, the wand reader can be shaped such that it can be held only in one way by the user such that the reading orientation is known. There is no guarantee, however, that the user will not somehow hold the wand reader incorrectly. Problems also arise as regards whether the user is left-or right-handed.

Figure 21:
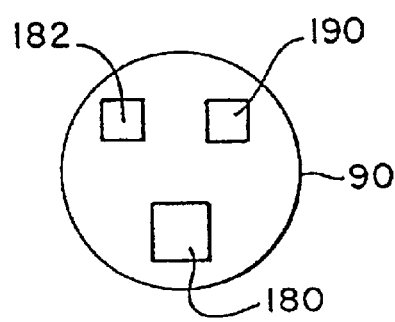
FIG. 21 shows an alternative configuration for the pen-type optical reader of FIG. 18.
Figure 22:
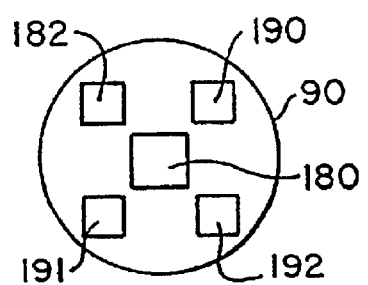
FIG. 22 shows an alternative configuration of the pen-type optical reader of FIG. 18.
Figure 23:
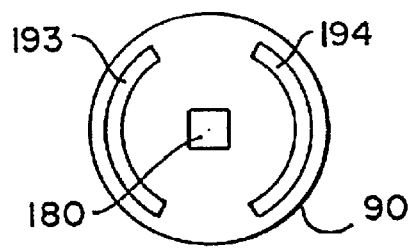
FIG. 23 shows another alternative configuration of the pen-type optical reader of FIG. 18.

A preferred solution is to provide sufficient reading points to allow the orientation to be determined. For example, as shown in FIG. 21, a principal reading point 180 and second and third reading points 182, 190 are also provided, each at a corner of a nominal triangle of known dimension. In that case, three reflectivity readings will be obtained, giving three time lag values for a corresponding transition point on each of the readings. From this information, the instantaneous speed, the spacing between the reading points 180, 182 and 190 in the reading direction and, hence, the orientation of the wand reader 90 can be determined. An alternative configuration is shown in FIG. 22 in which the principal reading point 180 is used for basic bar coding reading and four additional points 182, 190, 191, 192 provide the desired speed and orientation information. A further variant is shown in FIG. 23 in which a pair of opposing elongate, arcuate additional reading zones 193, 194 are provided, allowing speed and orientation information for decoding the reading to be taken by a principal reading point 180.

Using the system above, the measurement of the scanning speed is simply and accurately achieved, and variations in the scanning speed can be measured. Indeed, variations in scan speed from five inches per second to twenty-five inches per second can generally be detected and provided for without difficulty.

It will be seen that additional information processing will be required to ascertain the speed information, but a further advantage of the proposed implementation is that the simple time domain data for each reading window can be stored in the wand reader and downloaded to a personal computer or other processor. At that stage, the additional processing steps and a complete decode can be carried out. As a result, the power, processing and memory burden on the wand reader is minimized.

It will be seen that the above teachings relate to any scanner type suitable for hand-held scanning and being essentially portable, capable of reading a bar code symbol or similar information carrying symbol. The information can be downloaded from memory in the hand-held scanner by means of any suitable interface to a personal computer or other access point or computer network, and corresponding information called up from a web site or corresponding main memory location.

Although the invention has been discussed with reference to certain housings, triggering or mode-switching mechanisms and other features of the disclosed embodiments, it will be understood that a variety of housing styles and shapes and triggering mechanisms could be used. Other conventional features of bar code reading systems can also be included if so desired. The invention is preferably implemented using miniaturized components such as those described herein or in the materials referenced herein, or otherwise known in the art.

Additionally, even though the present invention has been described with respect to reading one dimensional bar codes, it is not limited to such embodiments, but may also be applicable to more complex indicia scanning or data acquisition applications such as two dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

In addition to being packaged in specific housings, the elements of the scanner may be implemented in a very compact assembly or OEM subassembly such as a single integral module or "scan engine". Such a module can interchangeably be used as the dedicated pointer/scanning element for a variety of different writing instruments, housings, operating modalities and types of data acquisition systems.

The module could advantageously comprise various optic subassemblies mounted on a support, and photodetection components, such as a photodiode, charge coupled or solid state imaging device. Control or data lines associated with such components may be connected to an electrical connector mounted to enable the module to be electrically connected to a mating connector associated with other elements of the data acquisitions system.

An individual module may have specific scanning or decoding characteristics associated with it, e.g., operability at a certain working distance, or operability with one or more specific symbologies or printing densities. The characteristics may also be defined through the manual setting or factory setting of control parameters associated with the module. The user may also adapt the data acquisition system to scan different types of articles or operate at different ranges, or the system may be adapted for different applications by interchanging modules in the data acquisition system through the use of a simple electrical connector.

The scanning module described above may also be implemented within a self-contained data acquisition unit or portable computer including one or more such components as keyboard, display, printer, data storage, application software, and databases. Such a unit may also include a communications interface to permit the data acquisition unit to communicate with a host computer, or other components of a data processing system, or with remote computers through a local or wide area network or with the telephone exchange network, either through a modem, XDSL interface or an ISDN interface, or by low power radio broadcast from a portable terminal to a stationary or mobile receiver and thereafter to other system components.

Although we refer to the optical reader 90 as a "pen reader" for convenience, it is to be understood that the reader may be operable either as a fixed beam "wand" type reader, in which the symbol is scanned by manual motion of the reader by the user to move the beam spot across the symbol, or a moving beam scanner in the reader itself in which a motor drive moves a mirror (or other optical element or assembly, including possibly the light emitter) to create a moving beam. The optical reader of the present invention may also be embodied in different housings other than "pen" shaped housings.

Another embodiment of the present invention provides the capability of optionally utilizing the pen reader 90 as a light pointer, using the beam emitted from the light source 94 (which for reasons of visibility would typically be a semiconductor laser). Such laser pointers are useful for highlighting features in a slide presentation, allowing the lecturer to stand at some distance away from the screen. In such an application of the pen reader, the reflector 95 may or may not be activated, depending on whether one wanted a stationary spot pointer, or a pointer which projected the image of a line or circle on the target. The description of the operation of a convertible pointer/bar code reader (in a housing without the writing instrument) is described in greater detail in U.S. patent application Ser. No. 08/936,288, which is hereby incorporated by reference.

A manually operated multi-position trigger switch (such as the clip C, in FIG. 2 or a slide switch as shown in the embodiment of FIG. 4) may be used to switch between the various modes of operation of the pen reader. In a first position of the switch, the laser diode 94 is switched off, and no beam is produced. In a second position, the laser diode is switched on and is reflected from the stationary mirror 95, thereby providing a fixed pointing beam. In a third position of the switch, the scanning mirror 95 is actuated, causing the beam to be scanned, thereby generating a visible line on the surface that is being pointed to. In the preferred embodiment, the scanning is in one dimension so that the resultant line on the screen is straight. In an alternative embodiment, however, the scanning mirror 95 could cause the beam to be scanned in two orthogonal directions, thereby forming any desired pattern, such as a Lissajous pattern or a circle, on the screen. More complex scanning arrangements could also be envisaged, with the laser being turned on or off at predetermined intervals in conjunction with a predetermined scan path in a plane being implemented so that a predetermined image or curvilinear figure can be projected onto the screen such as a square or triangle, or a pattern of dots forming any other desired figure.

One of the differences between operating in a bar code reading mode and a pointing mode is that the target is located at, and the beam spot is focused at, a distance of a few inches in a reading mode, and at ten or twenty feet in a pointing mode. The laser diode itself will normally be packaged with a focusing lens that focuses the beam spot for bar code reading at a relatively short predetermined working range from the end of the reader. In order to implement a dual distance, and dual mode device, an additional lens L1 may be provided which is disposed within the housing and moved into the optical axis of the first focusing lens when the pointing mode is activated. Thus, in the pointing mode, the beam will pass through two lenses and will focus at a substantial distance away from the end of the pointer. Lenses L1 may be mechanically moved in and out of the beam path by direct action of the switch being manually moved by the user between reading and pointing modes of operation.

For example, pushing the clip C in an inward direction may move the lens L1 along a track and click into a predetermined fixed position in the path of the outgoing laser beam. The track can be spring loaded, so that another movement of the clip C will release it out of the beam path.

Alternatively, lenses L1 may be fixed in position in the housing, and the beam path moved into either L1 or a clear path to the window. In that alternative, the beam path may be moved by the mirror, or by changing the position of the source.

If the trigger is a multi-position trigger, the positions of the trigger could be programmed so that different contacts correspond to different projected images. Thus, the pen could provide an image of a straight line when the trigger is set in a first position and a projected circle when the trigger is set in another position. Different positions of the trigger could also provide different lengths of line and/or different sizes of circle or other images that are being projected.

Scanning of the beam, of course, reduces the visibility of the image with respect to the visibility of the spot generated by a fixed beam. To compensate, the laser output power may be increased depending upon the position of the trigger or the mode of use.

The convertible laser pointer/scanner of this embodiment may also be embodied in a stylus for a pen computer, such as shown in U.S. Pat. No. 5,369,262, herein incorporated by reference. Such stylus can be used with active matrix or passive (pressure sensitive) display terminals. The laser pointer may also be embodied in a writing instrument, such as a pen or mechanical pencil, such as depicted in U.S. patent application Ser. No. 08/794,782, herein incorporated by reference.

In addition to the above noted features, it is possible to incorporate other features into the pen, including making it a miniature portable computer with a small (e.g., 1-line) LCD display, and a small number of input buttons for entry of data or control operations, or a trackball for scrolling. A voice recorder can also be implemented for taking dictation or reminder messages. A radio receiver may also be incorporated with the same housing so the unit may function as a pager with a small, one-line display.

Voice recognition or motion detection may be used to initiate operation of any predetermined computer function. To the extent a more sophisticated motion detection system could be implemented in the pen, handwriting recognition, signature verification or authorization, and similar functions could be implemented. The motion of the pen in space could also be captured in memory and translated into equivalent text so that the pen does not have to actually write on paper in order for the data "written" by the motion of the pen to be recorded.

Alternatively, the laser pointer may also be embodied within the housing of a portable, hand-held data terminal or computer (sometimes called a "portable digital assistant") such as depicted in U.S. patent application Ser. No. 09/047, 015.

Rather than switching between a pointing and a reading mode, the manually operated multi-position trigger switch may be used during the reading mode to move one of the components, for example, the lens L1, between a first position in which the light beam is focused at a first focus within a first working distance relative to the window 96, and a second position in which the light beam is focused at a second focus within a second working distance relative to the window 96. One of the foci may be located inside the housing, or at the window, or at a close-in distance near the window in order to read close-in indicia located in the first working distance at a range of several inches away from the window. The other of the foci may be located at a far-out distance away from the window in order to read far-out indicia located in the second working distance at a range of several feet away from the window.

Thus, the instrument can read close-in and far-out indicia by moving the movable component which, as previously mentioned, can be jointly moved by sliding a button on a slide switch mounted on the housing, or can be moved by a drive that is electrically energized by manually pressing a button on a switch.

FIG. 10 schematically depicts a pushbutton switch 200 which, when depressed, causes an electromagnetic coil 202 to generate an electromagnetic field that interacts with a permanent magnetic field of a permanent magnet 204. The focusing lens L1 is mounted for joint movement with the magnet 204. The magnet is cantilever mounted on a flexure 206, such as a leaf spring, having its end opposite the magnet anchored and fixed in position. The interaction of the fields causes the flexure 206 to oscillate and, in turn, moves the lens in and out of the optical path, thereby focusing the light beam traveling along this optical path to be focused at the first or the second focus to selectively read indicia located at one of the foci.

In accordance with this invention, rather than incorporating a writing implement in the portable housing, the electro-optical assembly in the instrument may include not only a bar code scanner as described above, but also an image projector for projecting an image, such as an alphabetic word 210 depicted in FIG. 11. The projector may include its own subassembly of components separate from the scanner components, but preferably, at least some of the components are shared and are selected to perform its function by a mode selector switch 212 mounted for sliding movement on a pen-shaped housing 214 for movement between a pair of switched states corresponding to a pair of reading and display modes, respectively.

Figure 12:
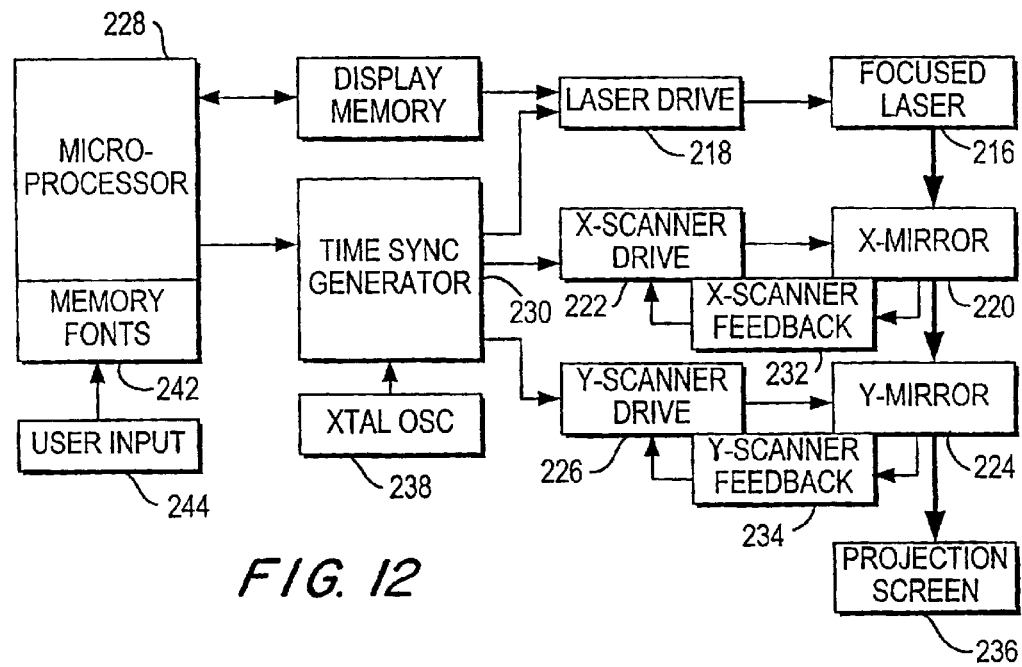
FIG. 12 is a block diagram of an electro-optical assembly on the instrument of FIG. 11.

As more specifically depicted in FIG. 12, a light source such as a laser 216 energized by a drive 218 emits a laser beam to a first x-mirror 220 oscillatable by an x-drive 222 for horizontally moving the laser beam back and forth at a first sweep frequency $f_h$ along a first direction, commonly termed "X-axis" sweeping, and, in turn, to a second y-mirror 224 oscillatable by a y-drive 224 for vertically moving the laser beam up and down at a second sweep frequency $f_v$ along a second direction, commonly termed "Y-axis" sweeping. The first and second directions are mutually orthogonal. The first or horizontal sweep frequency is generally much faster than the second or vertical sweep frequency. In the preferred embodiment, $f_v$=60 Hz and $f_h$=3.8 kHz or $n(f_v)$ where n is the number of pixels within one horizontal sweep. A control processor 228 is operative for controlling a time synchronizing generator 230 which, in turn, controls the x-drive 222 and the y-drive 226 to insure that the x-mirror 220 and the y-mirror 224 oscillate at the correct speeds. An x-scanner feedback circuit 232 and a y-scanner feedback circuit 234 monitor the sweep frequencies and angles of the mirrors 220, 224 and assist the drives 222, 226 in maintaining the rated speeds and scan angles. A crystal oscillator 238 serves as the master clock. In addition, the feedback circuits 232, 234 can be used to control the brightness of the laser spot as it traverses the screen so that uniform brightness across the screen is obtained.

The resulting light pattern known as a "raster" is identified in FIG. 11 by the reference numeral 240 and is larger in area than the housing. Starting at point A, a spot of focused light from the laser 216 is swept by the drive 222 at the horizontal frequency along the X-direction to the point B to form a first scan line. Thereupon, the drive 226 sweeps the spot from the point B at the vertical frequency along the Y-direction to form a second scan line. The formation of successive scan lines proceeds in the same manner. In a preferred embodiment, for a display area or a projection screen 236 measuring on the order of 4 square inches (e.g., 2.25 inches×1.75 inches) at a distance of about 5 inches from the instrument, the resolution of the raster is about 120 lines or pixels along the height (Y-direction) and about 64 pixels along the width (X-direction).

The image 210 is created in the raster pattern 240 by pulsing the laser 216 on and off at selected times under the control of the processor 228 and the generator 230 which, in turn, control the laser drive 218. The laser 216 produces visible light and is turned on only when a pixel in the desired image is desired to be seen. For example, the letter "L" in the image word "SYMBOL" in FIG. 11 is formed by turning the laser on at pixel D in a scan line, and again at pixel E in another scan line, and so on until the vertical leg of the letter "L" is formed. The horizontal leg of the letter "L" is formed by turning the laser on at successive pixels F, G, H, along the same scan line.

Every letter or number can be formed by this technique. Indeed, any image, including graphical designs and logos, and even bar code symbols, can be formed from a plurality of such bits arranged along the X-and Y-axes. Fonts can be stored in a font file in memory 242 for access by the processor 228.

Returning to FIG. 12, the same laser 216 can be used in the reading mode for reading symbols, and in the display mode for projecting the beam spots. The mirror 220 is shared in both modes, and the mirror 224 is shared only when two axis reading is desired. The manual selection by the switch 212 is depicted in FIG. 12 by the user input box 244. The reading mode can be entirely eliminated. Actuation of the display mode can be performed by depressing a button at the top end of the housing which is remote from the tip.

The assembly can fit in a volume of about 0.5 cubic inches and, hence, can fit in a housing configured as a pen, a ring, a key chain, a pendant, or any other device having a small form factor. Preferably, the components of the assembly are mounted on a common support, such as a printed circuit board, and constitute a compact module of rectangular, parallelepiped shape. As mentioned above, the liquid crystal display (LCD) is a component that limits size reduction in many devices. An LCD has a useful viewing angle limited to about 30 degrees and typically artificial light is required to provide adequate brightness to read the display in various lighting environments. Hence, the LCD is not useful in highly miniaturized applications with which this application is concerned and, as a result, the image 210 need not be projected at a distance from the housing 214 as depicted in FIG. 11, but can be projected onto a room wall, or a projection screen 236 located on and built into an exterior wall of the housing itself, or, as will be explained below in connection with FIG. 15, can be located on a nearby surface adjacent the housing, including a support surface such as a countertop that supports the housing and, in some applications, can even be projected onto the user's clothing, such as a shirt, which serves as a convenient projection screen. In some cases, the projection could be directed on the user's palm although the contrast is poor on human skin.

The image area is roughly 4 to 8 square inches to achieve a contrast ratio of around 4:1 to enable easy viewing. A larger image area would require the laser power to exceed CDRH-II safety levels if the display brightness and contrast ratio are to be maintained. Conversely, the brightness and contrast ratio are reduced for an increased display area if the laser power is kept constant.

The display area can be changed dynamically by changing the scan angles of the mirrors 220, 224, by changing the actuation power to the scan mirrors, or by slightly changing the drive frequencies. The image height is scanned at a minimum of 40 Hz to reduce flicker. The x-mirror 220 is preferably a flat mirror mounted on a torsional band. The center of rotation of the mirror is symmetrical to the rotating axis to minimize audible noise. The display area is preferably rectangular.

The laser power is preferably varied with the scan speed to maintain a display of uniform visibility. The product of laser power and pixel duration should remain a constant throughout the display. The on-off duration of each spot during a scan line can be varied so that the line resolution can be considered "infinite".

A mask can be included in the housing to block the scan lines at the top and bottom of the raster pattern 240 to reduce distortion due to scan speed variation. The mode selector need not be a slide switch 212, but can be any user actuated switch or button, and even voice activation can be used.

As described so far, the instrument has a reading mode in which it can read one- or two-dimensional symbols and/or a display mode in which it can project an image on a screen or analogous viewing surface. If the symbol is a URL address, the instrument can be made Web capable to provide Internet browsing via a wireless link. Information from a website can be downloaded into the instrument and displayed by the image projector.

Figure 13:
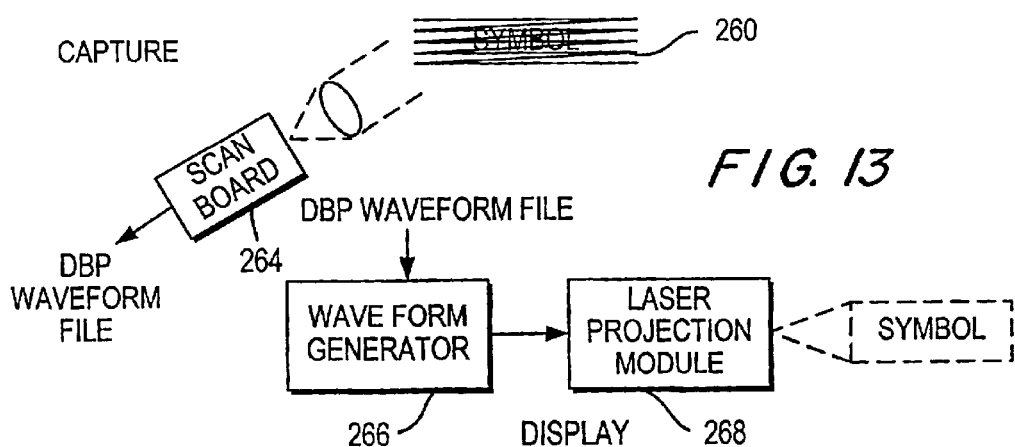
FIG. 13 is a block diagram depicting an image capture operation of the assembly of FIG. 12.
Figure 14:
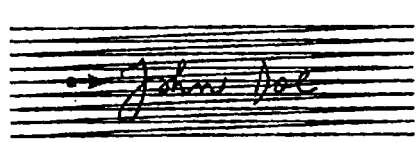
FIG. 14 is a diagram of the operation of the assembly of FIG. 12 during capture of a signature.

The instrument can be used in reverse as a camera or capture device to capture an object image, such as the word "SYMBOL" 260 in FIG. 13, or to capture a handwritten signature 262 in FIG. 14, in a capture mode. The field of view can be changed dynamically by varying the scan angles of the mirrors 220, 224. The resolution can be varied by dynamically changing the scan speed. The image 260 in FIG. 13 can be processed by any two-dimensional, solid-state array of sensors, such as a charge coupled device, and by signal processing electronics on a scan board 264 on which the electro-optical assembly is mounted to generate a DBP waveform file which, in turn, is conducted to a waveform generator 266 and the image projector 268 to generate the display. To reduce noise and prevent a large DC offset during signal capture, the laser light during each horizontal scan line can be pulsed to sample the image.

In the case of a pen-shaped instrument, accelerometers can be integrated therein, for sensing the motion of the pen as the user writes. The accelerometers also sense hand-jitter and correct the hand-jitter. By sensing the movement of the user's hand, the signals from the accelerometers can be used to dynamically change the size of the display or to zoom-in on a particular area of the display. For example, moving the pen terminal closer to the projection screen will enable a zoom-in display.

The accelerometers can also sense the movement of the hand and pan the display. Hence, it can be used as a scroll bar. For example, moving the pen sideways will pan the display left and right, and moving the pen up and down will scroll the display up and down. Of course, the display can be scrolled or panned by voice, trackball or "touchscreen" input.

Figure 15:
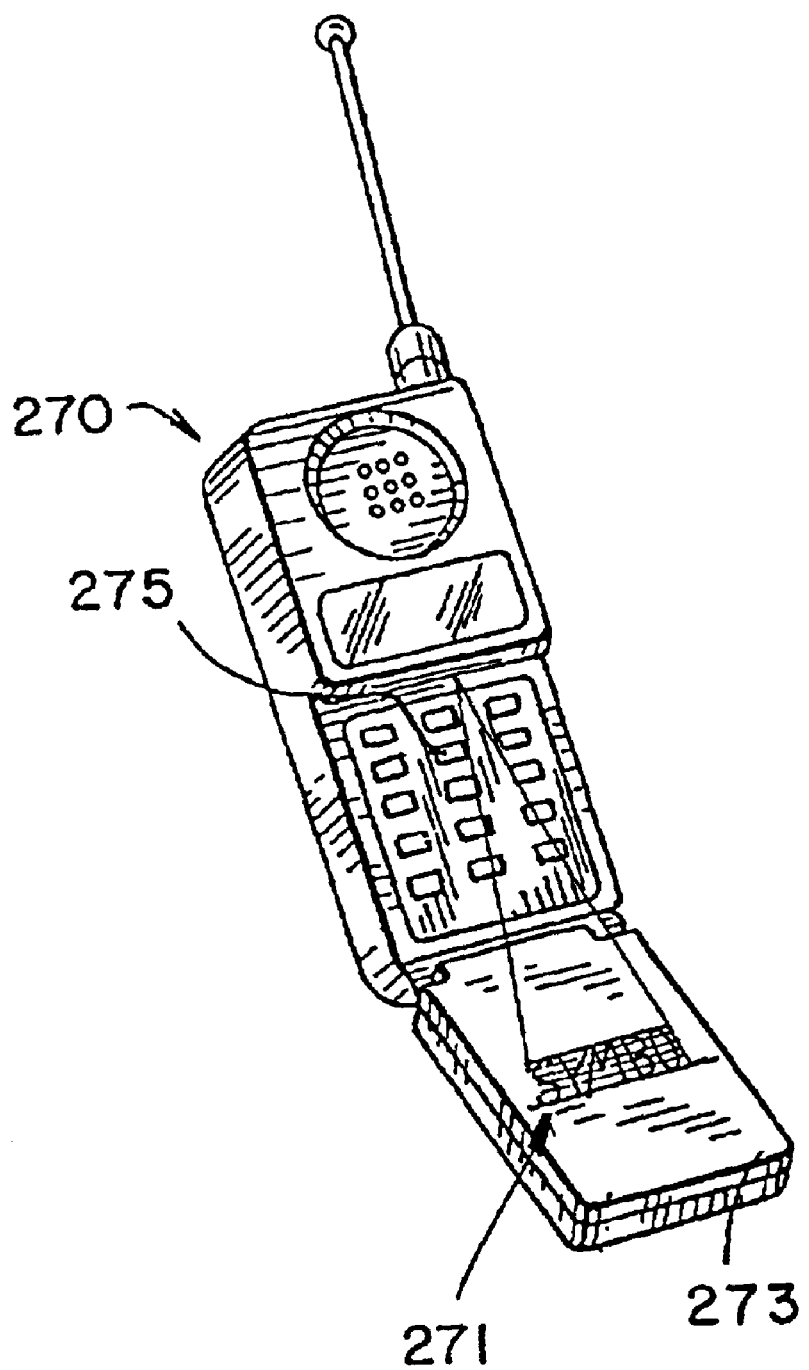
FIG. 15 is a perspective view of a telephone with a projected display image according to this invention.

The laser projection display of this invention is superior to a conventional LCD display because the projection display has a view angle of 90□, only consumes power on demand, and can generate an image larger than the instrument itself. As shown in FIG. 15 for the application of a cellular telephone 270, the projection display 271 can be projected on the exterior surface of a cover 273 used to overlie and protect the keypad 275 when the phone is not in use.

Of course, both the LCD and the projection displays can be used on the same instrument. The LCD can be used for short messages, or for private viewing of the messages, while the projection display can be used for longer messages.

In other applications, the miniature size of the electro-optical assembly can be mounted on the side of a user's head, for example, in an eyeglass frame, for projecting an image on an eyeglass lens in the user's field of vision.

Figure 16:
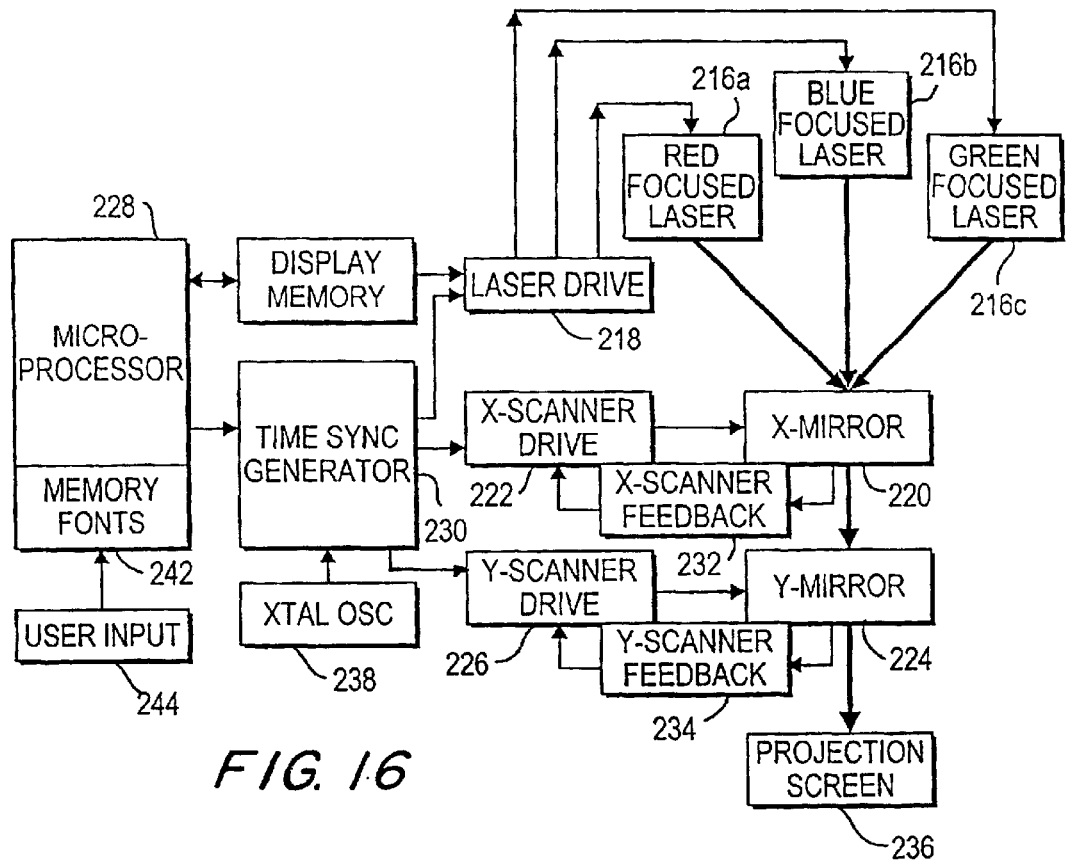
FIG. 16 is a view analogous to FIG. 12 for displaying a colored image.

FIG. 16 is analogous to FIG. 12, and like reference numerals have been employed to identify like parts. The major difference is that three lasers 216a, b, c are focused on the mirror 220, rather than the aforementioned single laser 216. These three lasers produce laser beams of different colors, e.g., red, blue and green, respectively, by using lasers of different frequencies, or by interposing colored filters in the path of the lasers. The light spots formed by each laser are superimposed on one another at mirror 220.

If only one of the lasers is actuated, then the spot on the mirror 220 will have the color of the actuated laser. If more than one laser is actuated simultaneously, then the spot on the mirror 220 will have the mixed color of all the actuated lasers. The use of red, blue and green lasers enables any color in the spectrum to be formed. In addition, the use of lasers of only two different wavelengths enables reduced sets of color.

As before, the spot of the desired color is swept in mutually orthogonal directions by the drivers 222, 226. The laser drive 218 is connected to each laser and pulses them on and off to form a bit-mapped image. This image is colored in dependence upon which laser(s) has/have been actuated for each pixel of the image. Hence, the entire image can be colored all red, blue, or green, or any mixture of these colors. In addition, each pixel can be separately provided with a desired color so that the entire image comprises multiple colors.

Figure 17:
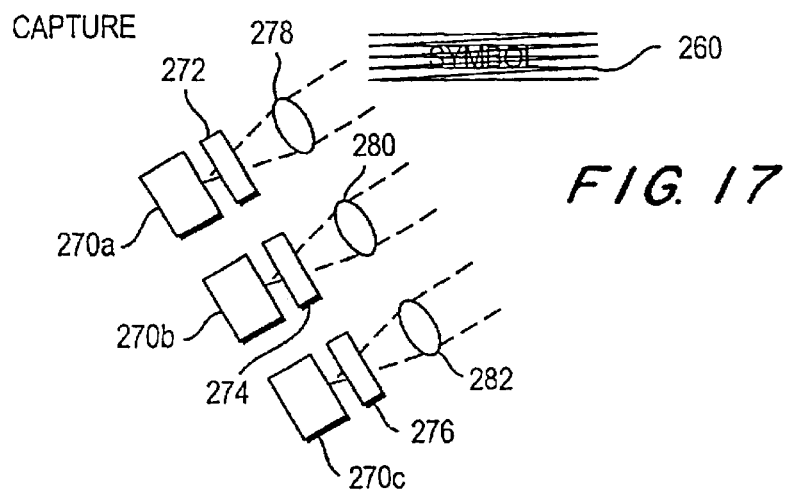
FIG. 17 is a view analogous to FIG. 13 for capturing a colored image.

FIG. 17 is analogous to FIG. 13, and shows the capture of a colored indicia 260 by employing a plurality, for example, three, of photodetectors 270a, b, c looking at the indicia through differently colored filters 272, 274 276, for example, red, green and blue filters, respectively. Focusing lenses 278, 280, 282 focus the image on the respective photodetectors.

Figure 24:
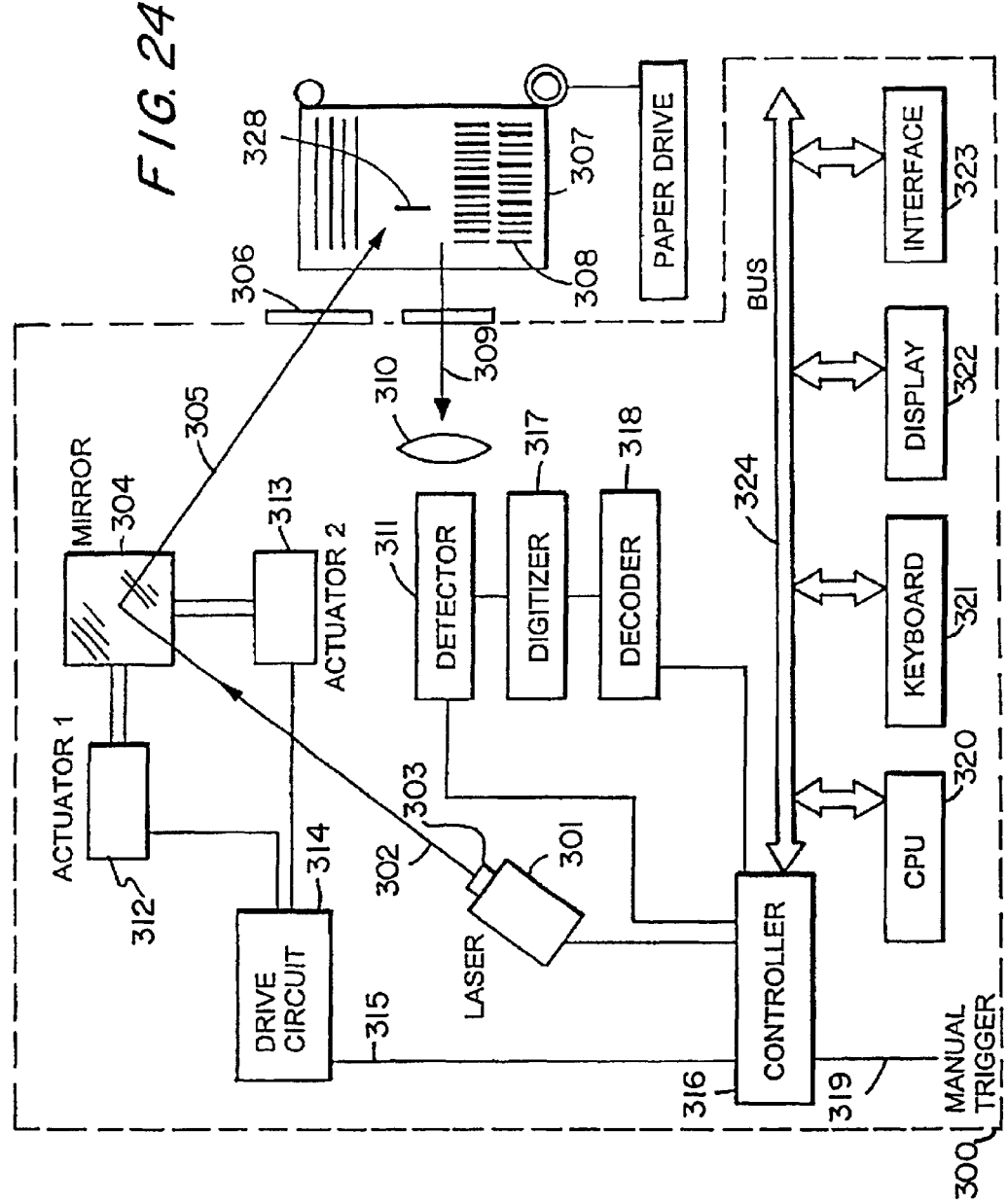
FIG. 24 is a highly simplified block diagrammatic representation of a scanning system for reading and writing bar codes or other indicia.
Figure 25:
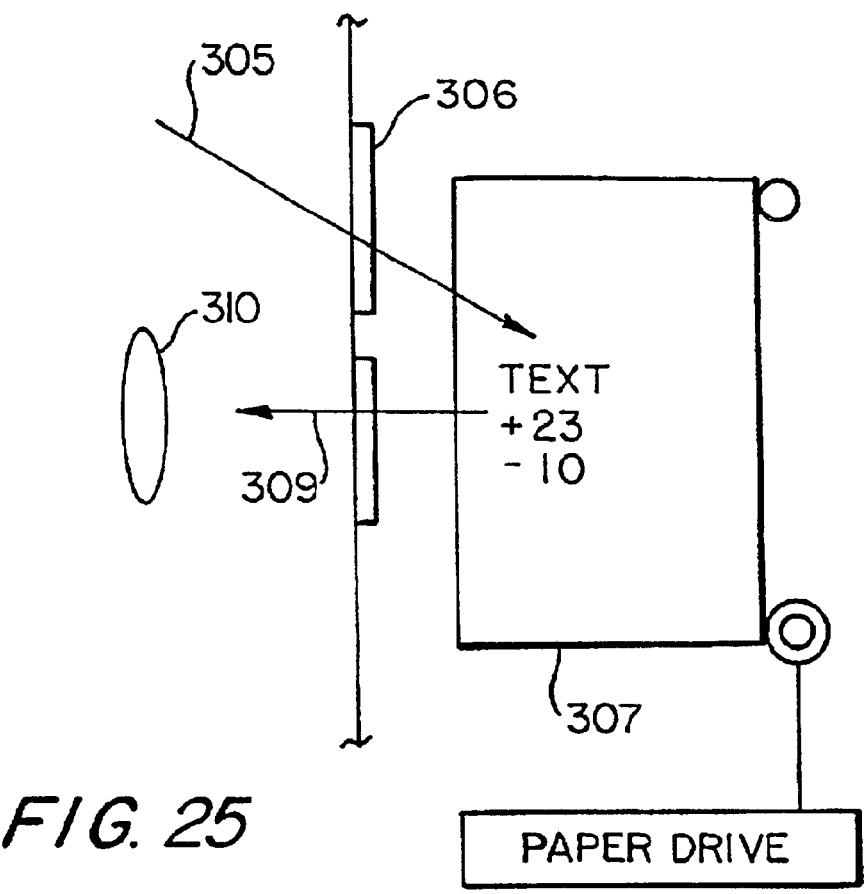
FIG. 25 is a portion of the block diagram of FIG. 24 modified to illustrate the system used for reading and writing alphanumeric characters of text.
Figure 26:
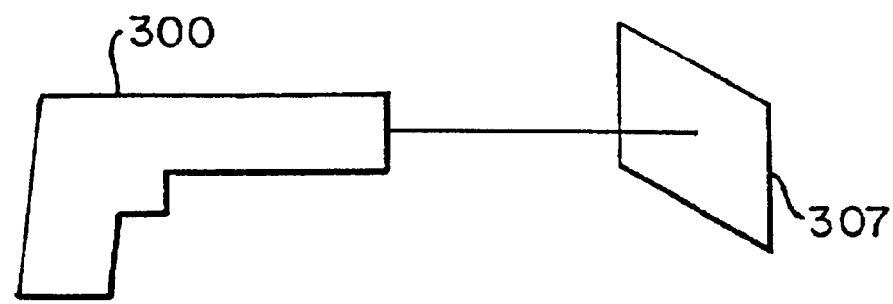
FIG. 26 is a diagrammatic view of a hand-held embodiment of the system.

Referring to FIG. 24, there is shown a highly simplified block diagram representation of an embodiment of one type of bar code read/write apparatus that may be designed according to the principles of the present invention. The apparatus may be implemented in a portable scanner 300, or preferably as a desk-top workstation or stationary scanner. In the preferred embodiment, the apparatus is implemented in a light-weight plastic housing.

Turning to FIG. 24 in more detail, an outgoing light beam 302 is generated in the reader 300 by a light source 301, usually a laser diode, light emitting diode, or the like. The light beam from light source 301 is optically modified by an optical assembly 303 to form a beam having certain characteristics. The beam sized and shaped by the assembly 303 is applied to a mirror or scanning unit 304. The light beam is deflected to the scanning unit 304 in a specific scanning pattern, i.e., to form a single line, a linear raster scan pattern, or more complex pattern. The scanned beam 305 is then directed by the scanning unit 304 through an exit window 306 to impinge upon a target 307 disposed a few inches from the front of the reader. In the embodiments in which the reader 300 is portable and hand-held, the user aims or positions the portable unit so this scan pattern transverses the symbol 308 to be read. Reflected and/or scattered light 309 from the symbol is collected by a lens 310 and detected by a light detector 311 in the apparatus, producing electrical signals to be processed and decoded for reproducing the data represented by the bar code. As used hereinafter, the term "reflected light" shall mean reflected and/or scattered light.

The scanning characteristics of the mirror 304 may be independently controlled by drive units 312 and 313. The drive units are operated by control signals from a drive circuit 314, which is responsive to digital control signals sent over the control bus 315 by a central processing unit or controller 316, which is preferably implemented by means of a microprocessor contained in the reader 300.

The light detector 311 includes an analog amplifier having an adjustable or selectable gain and bandwidth. The controller 316 is connected to the light detector to effect the appropriate adjustment of circuit values in the analog amplifier in response to control signals applied to the controller 312 over the control bus 326.

An output of the light detector 311 is applied to a digitizer 317. The digitizer 317 converts the analog signal from the light detector 311 into a pulse width modulated digital signal. One type of digitizer is described in U.S. Pat. No. 4,360,798. As previously noted, circuits such as those contained in digitizer 317 have variable threshold levels which, according to the present invention, can be appropriately adjusted. A digitizer control unit is incorporated in the digitizer 317 and functions to effect the appropriate adjustment of threshold levels in the digitizer in response to control signals applied to the digitizer by the controller 316 over the control bus 324.

The output of the digitizer 317 is applied to a decoder 318. The operation of the decoder 318 apparatus is similar to that as described in prior art devices such as noted in the Background of Invention section.

One of the key characteristics of the invention is to provide a suitable medium that can accommodate both reading, writing, and possibly, even erasing. An example of a medium that is suitable for both reading and writing is thermal paper. In the writing mode, the laser light source may be pulsed so that it will image a sequence of dots upon the medium as the beam is scanned. Of course, in such applications the scanner must be fixed and stationary, so that an alphabetic or numeric character can be composed by an appropriate two dimensional sequence of dots.

Reference may be made to U.S. patent application Ser. No. 789,705 filed Nov. 8, 1991 and assigned to the same assignee as the present application, and herein incorporated by reference, to illustrate scanning in two directions by a single mirror 304.

The apparatus may be switched from reading to writing mode (and vice-versa) by means of a manual switch 319. The switch provides an input to the controller 316, which in turn provides the appropriate control signals to the drive circuit 314, the laser 301, and the detector 311 depending upon the mode selected.

The apparatus 300 may also include a CPU 320, a keyboard 321, a display 322, and an interface 323 for connection to external peripheral devices. Such components may be connected along a control and data bus 324 to each other and to the controller 316.

Another method of switching from reading to writing mode may be performed automatically under control of the CPU 320. In such an embodiment, a control indicia 328 is provided on the medium. Such indicia is situated on the medium at the point at which it is desired to switch from reading to writing.

Although the present invention has been described with respect to reading or writing one or two dimensional bar codes, it is not limited to such embodiments, but may also be applicable to more complex indicia scanning applications. It is conceivable that the method of the present invention may also find application for use with various machine vision or optical character recognition applications in which information is derived from other types of indicia such as characters or from the surface characteristics of the article being scanned, and information printed or recorded thereon.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition and printer systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition and printing system.

The module would advantageously comprise an optics subassembly mounted on a support, and a photodetector and signal processing subassembly. Control or data lines associated with such subassemblies may be connected to an electrical connector mounted on the edge or external surface of the module to enable the module to be electrically connected to a mating connector associated with other elements of data acquisition or processing system.

An individual module may have specific scanning, decoding, or printing characteristics associated with it, e.g., operability at a certain working distance, or operability with a specific symbology or printing speed or density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained fixed or portable data acquisition system including one or more such components as keyboard, display, data storage, application software, and databases. Such a system may also include a communications interface to permit the data acquisition system to communicate with other components of a local area network or with the telephone exchange network, either through a modem or an ISDN interface, or by low power radio broadcast from the portable terminal to a stationary receiver.

Rather than projecting an image from a pen-shaped instrument as in FIG. 11, or onto a front surface of a part of a portable instrument such as telephone cover 273 of FIG. 15, FIGS. 27–31 depict a portable instrument and an electro-optical assembly for projecting an image on a screen from behind the screen of the instrument.

Figure 27:
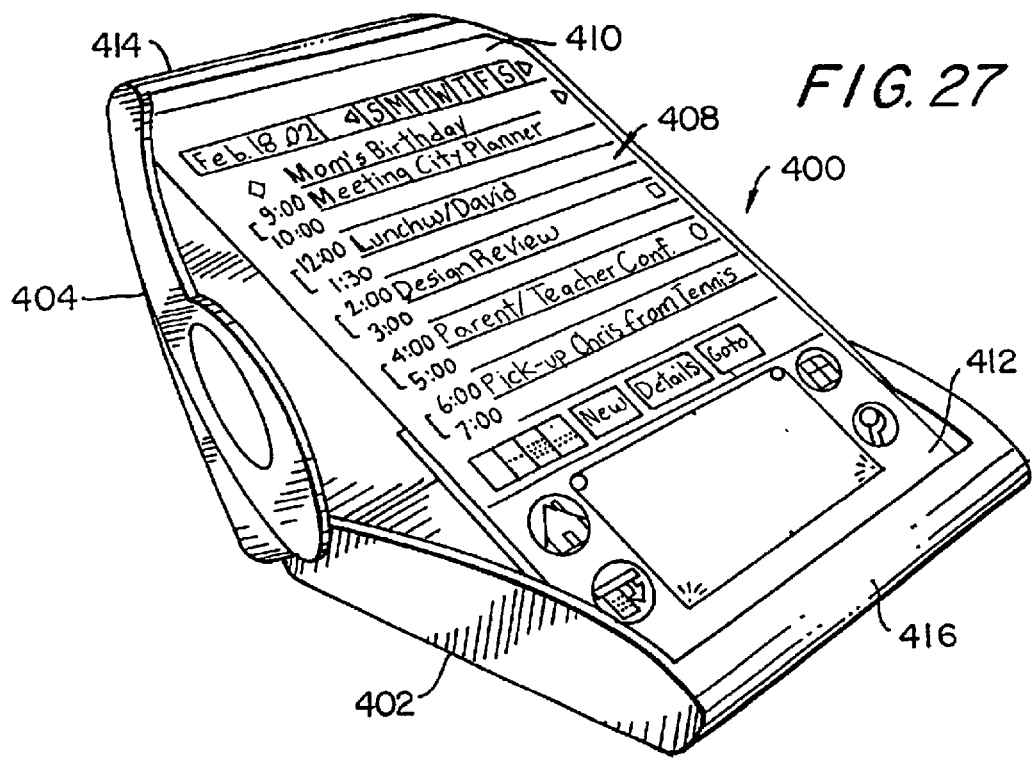
FIG. 27 is a perspective view of a portable instrument having a rear projector.
Figure 28:
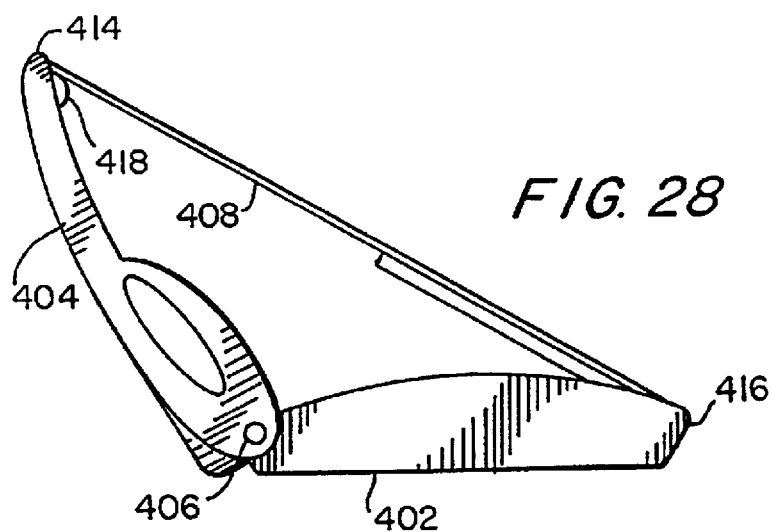
FIG. 28 is a side view of the instrument of FIG. 27.
Figure 29:
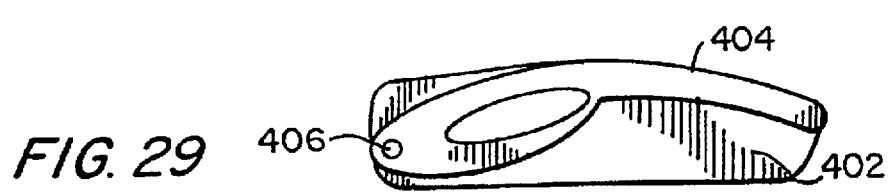
FIG. 29 is a side view of the instrument of FIG. 27 in a closed position.

Instrument 400 may serve as a personal digital assistant or portable computer and includes a folding, clamshell housing having housing parts 402, 404 pivotably connected at pivot 406 for movement between an open position depicted in FIG. 28 and a closed position depicted in FIG. 29. A flexible screen 408 extends across the housing parts in the open position. The screen has a diffusive optical property and blocks ambient light. The screen may be anchored at its upper and lower ends 410, 412 to outer edge regions 414, 416 of the housing parts, in which case, the screen folds in half in the closed position. Alternatively, the screen may be rolled about a roller 418, and the lower end 412 pulled to unroll the screen prior to latching the lower end 412 to the outer edge region 416 where, as illustrated in FIG. 27, the screen is held taut in the open position.

Figure 30:
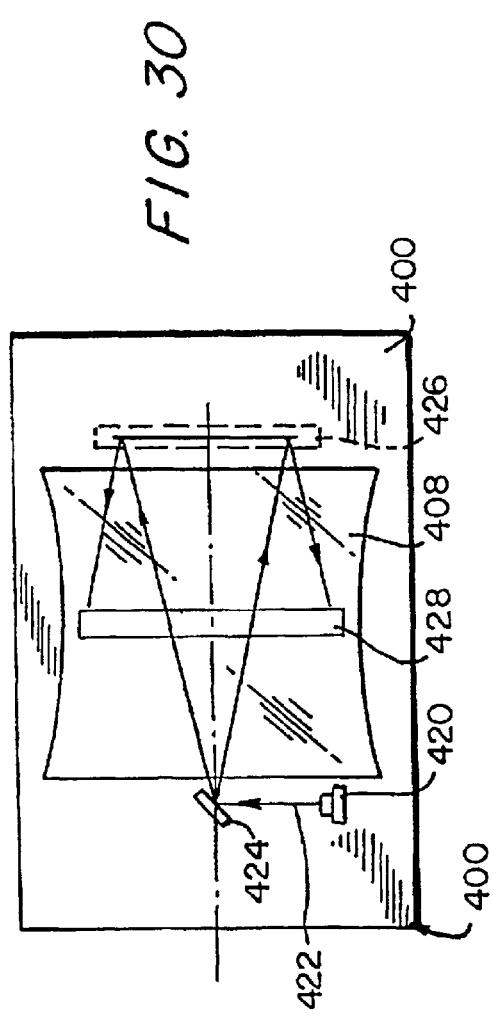
FIG. 30 is a top plan view of the rear projector of FIG. 27.

FIG. 30 depicts an electro-optical assembly or module for projecting an image onto a rear surface of the screen 408. A laser 420 in the instrument 400 directs a laser beam 422 to an X-scan movable mirror 424 for reflection therefrom to a stationary bounce mirror 426 for reflection therefrom to a Y-scan movable mirror 428 for reflection therefrom to the rear surface of the screen 408. The two-dimensional scan on the rear surface diffuses through the screen to the front surface for viewing. If the laser beam is modulated, dark and bright spots of light compose a raster image.

In the preferred embodiment, the X-scan mirror is driven at a high frequency (above 10 kHz) and over a narrow scan angle.(7.2□ mechanical), and is preferably a micromachined miniature mirror, but could be a mirrored polygon. The laser may be energized only when the X-scan mirror is moving in one direction, and deenergized when the X-scan mirror is moved in an opposite direction. The Y-scan mirror is driven at a low frequency (about 50 Hz) and over a wide scan angle.(28.5□ mechanical) and is larger than the X-scan mirror. The bounce mirror between the X-scan and Y-scan mirrors enables the scan angle of the X-scan mirror to be reduced without increasing the overall depth of the assembly. The screen size is about 4 square inches. The screen resolution is about 160×160 pixels. The screen is viewable 90□ in all viewing directions in contrast to LCD viewing angles which typically are limited to 30□. The electro-optical assembly of FIG. 31 can occupy a spatial volume of 12 mm×10 mm×8 mm. The display of this invention may utilize the same interface as an LCD display.

The display can be automatically powered up when the screen is moved to the open position.

The instrument 400 is battery-powered and portable and able to fit in one's pocket. The horizontal scan rate is preferably equal to or greater than 10 kHz to average or correlate the scanned data in order to average out the noise as well as to make the scanning more aggressive.

Horizontal distortion may be reduced by varying the spacing between pixels to match the movement of the scan mirrors. Vertical distortion may be reduced by blanking the top and bottom scan lines in the image, and by reducing display brightness and resolution. Brightness distortion can be reduced by changing laser power as a function of scan speed. A color filter can be associated or integrated with the screen 408 to improve contrast. Brightness compensation can be obtained by using a sensing element to detect ambient light.

Power consumption by the laser is estimated at 20–30 mw, whereas the power consumed by each scan mirror is less than 5 mw. This compares favorably to backlit LED displays. Power consumption can be reduced by projecting the image only when a trigger is depressed, or only when the sensing element indicates that the ambient light is below a threshold level.

A reflective or light-sensitive stylus can be detected on the front surface of the screen, thereby enabling this device to not only be used as a display screen, but also to be used as a touch screen. The stylus may have a pen shape terminating in a retro-reflective tip so that the position of the tip is readable by the display for the purpose of moving a cursor or selecting a projected icon.

The stylus may be designed to generate a sound, for example, a clicking sound, simulating the click of a button on a mouse or other pointing device. The sound can be detected by a microphone mounted in the display device.

Figure 32:
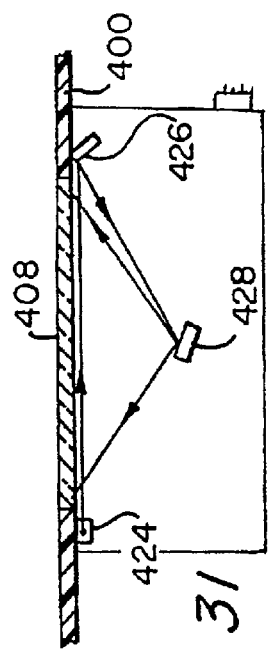
FIG. 32 is a broken-away side view of a thimble-like stylus.
Figure 31:
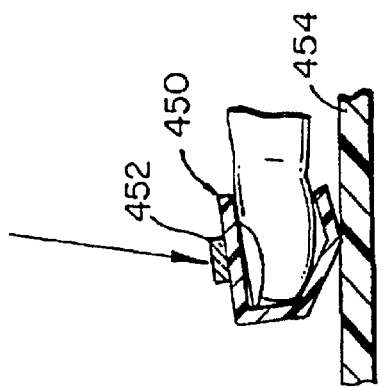
FIG. 31 is a broken-away side view of the rear projector of FIG. 30.

Instead of a pen shape, the stylus could be mounted on a fingertip and resemble a thimble 450, as shown in FIG. 32. A retro-reflective surface 452 could be provided on the thimble to redirect light incident thereon. When pressed against a surface 454 on which a display is projected, the thimble can emit a clicking sound due to mechanical flexing of a wall of the thimble. The pen- or thimble-shaped stylus is advantageously stored in a recess on the display device for ready access.

Figure 33:
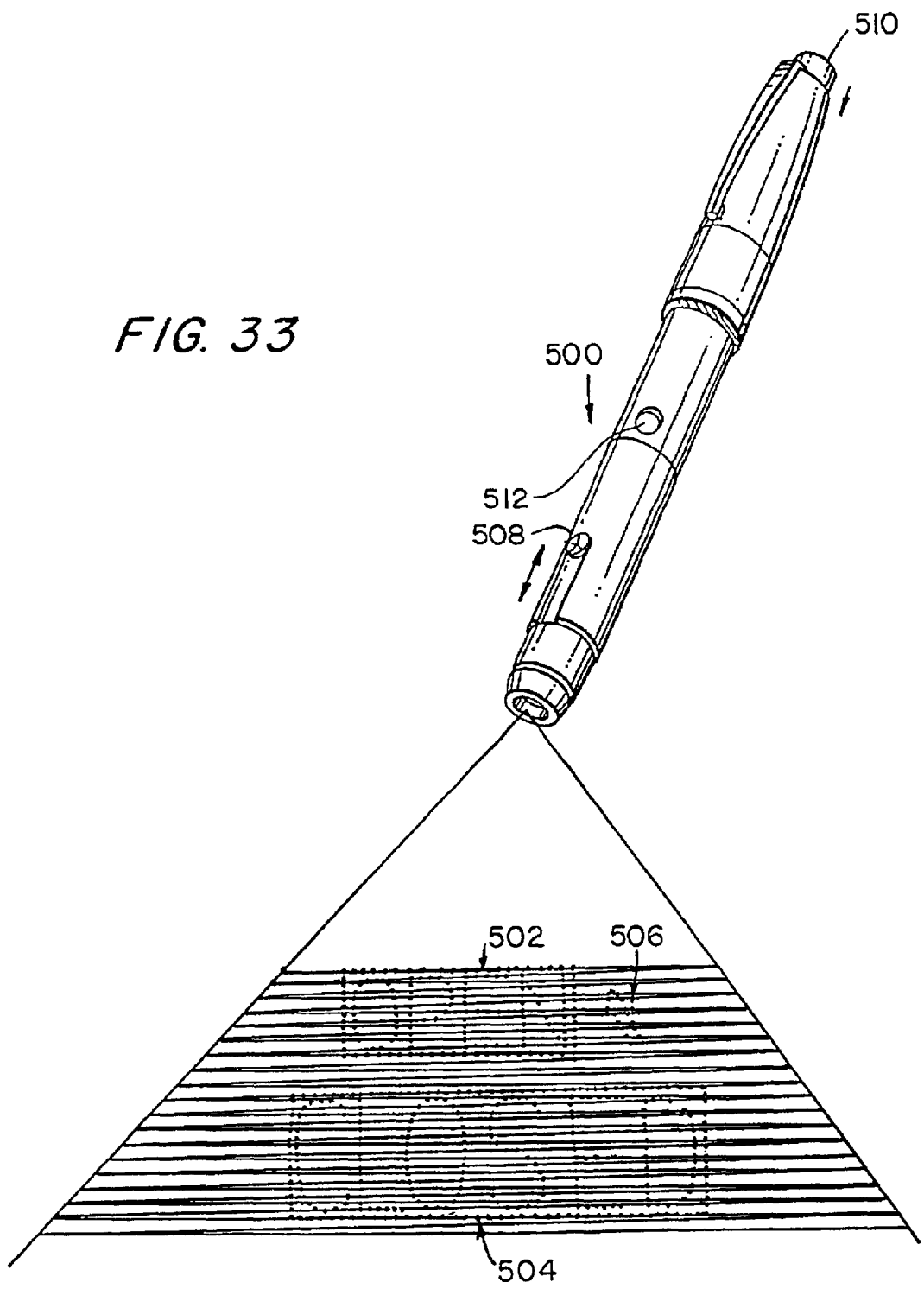
FIG. 33 is a perspective view of another portable instrument during a display mode of operation according to this invention.

FIG. 33 depicts a pen-shaped projector 500 analogous to the pen-shaped instrument 214 depicted in FIG. 11. Projector 500 includes the components depicted in FIG. 12 and, thus, is operative for projecting a display comprising graphics and text, such as the words "open" 502 and "closed" 504, each in its own rectangular bordered area to simulate a command button. The display further comprises a cursor 506 depicted, for exemplary purposes, as an arrow. A switch 508 mounted for movement on the instrument 500, or a thumbwheel, or an analogous control is provided to enable the user to move the cursor 506 to one of the command buttons 502, 504 to execute the command represented by the button, either immediately upon the cursor entering the button area, or after another manual action, such as the depression of the switch, has been performed. The cursor may either be continuously displayed, or caused to flash for increased visibility.

A trigger 510 at the top for the pen-shaped instrument 500 is depressed to initiate the display. A sensing element 512 on the instrument is operative for detecting ambient light and provides brightness adjustment and battery efficiency. For example, in a darkened environment, there is not as great a need for the display to be bright. Hence, the display need not be so intensely illuminated and, concomitantly, the on-board battery need not expend as much energy, thereby reducing power consumption.

The size of the projected display is a function of the angle through which the Y-scan mirror is moved, as well as the distance of the viewing surface from the instrument 500. In the preferred embodiment, four display lines of approximately equal length to constitute a rectangular display are generated. An on-board range finder can be employed to determine the distance between the instrument and the viewing surface, and to automatically control the angle through which the Y-scan mirror is moved. The user can also manually select the image size, for example, by moving a slide switch to a predetermined position in order to control the mirror angle and, in turn, the image size of the display.

The size of the displayed image in FIG. 3 is greater than the size of the module within the instrument 500. The image is focus-free and is readable over a wide range, for example, from one foot to infinity. No re-focusing of optics is needed to view the image at different distances relative to the instrument. This focus-free feature is obtained by having the laser beam cross-section or beam spot diverge at a rate equal to or smaller than the scan angle divided by the pixel resolution member. The size of the image is proportional to the viewing/projection distance away from the instrument.

The frame rate is optimized for a chosen display resolution. For example, 50 Hz is optimized for a display with 160-line resolution. A frame rate below 40 Hz may cause flashing. The display will start losing lines when the frame rate is above 70 Hz.

The display can constitute video images, live television or streaming video, a sign, a bulletin board, or in short, any image.

Additional features of the electro-optical assembly include conserving power by only activating the laser during part of the scan, conserving power by reducing laser power where the ambient light is dim and by increasing laser power when the ambient light is bright, minimizing friction by supporting the X-scan mirror by sleeve or jewel bearings and by supporting the Y-scan mirror by torsion hinges or magnetic springs, adding fold mirrors to obtain more than one line per scan, driving the Y-scan mirror at variable speed to compensate for projection distortion, driving the Y-scan mirror at constant speed and using an additional lens to compensate for projection distortion, configuring the Y-scan mirror as a polygon with curved mirror facets that compensate for projection distortion, driving the Y-scan mirror at a constant speed while driving the X-scan mirror at a variable speed to compensate for projection distortion, driving both X-scan and Y-scan mirrors at variable speeds to compensate for projection distortion, driving the Y-scan mirror at a wide scan angle for best compensation of projection distortion, and interlacing the scan lines produced by the Y-scan mirror.

Brightness compensation is obtained by varying the laser power within each frame. When the laser power is constant throughout the frame, the display is brighter toward the end of each scan line as the scanner slows down, and is dimmer in the center of each scan line as the scanner speeds up. To display an image having the same brightness throughout the frame, the laser power is adjusted as a function of the laser spot speed.

The different types of distortions which must be compensated include the laser spot (pixel) aspect ratio due to a non-linear scan speed profile, brightness distortion due to brighter and darker areas within the display area due to variable scanner speeds, and large scan angle distortion.

Still other features of the electro-optical assembly include driving the Y-scan mirror by a cam or crankshaft, configuring the screen with a filter transparent to laser light but opaque to ambient light, configuring the screen as a holographic diffusing element for a uniform viewing angle, configuring the screen as an optical touch screen where the position of a stylus on the screen is determined by the time that the laser beam reaches the stylus, configuring the stylus as a reflective element and positioning a photodetector behind the screen, configuring the stylus with a built-in photodetector and battery, configuring the stylus for wired or wireless operation, capturing an image with an additional photodetector placed behind the screen, and printing on thermal paper placed behind the screen.

The miniature size of the electro-optical assembly enables it to be mounted in many different kinds of housings, especially those where space is already at a premium. Thus, a cellular telephone can be internally provided with the assembly to project an image on the cover, as discussed above. In a preferred application, the image can be a list of telephone numbers. A pen, wand, or key chain can likewise contain the assembly and project any display. Even larger housings, such as a toy or desktop computer, can be equipped with the assembly. Any device whose use is enhanced by displaying information may employ the assembly to good advantage.

Where the device is a bar code symbol reader as described above, the display can be employed to visually advise a user of the status of the symbol reading. For example, the laser beam can be turned on and off during specified scans to form a human-readable message, such as "too far" or "too near" to advise the user that the reader is too far or near the symbol to be read. Other messages may include "tilted","specular" or the like to advise the user that there is a problem with the reading. The message could also indicate that the reading was successful. Thus, the display serves as a feedback device to the user.

It will be understood that each of the elements described above, or two or more together, also may find a useful application in other types of constructions differing from the types described above.

For example, the X-scan and Y-scan mirrors can be implemented as an array of miniature mirrors of the type used in video projection systems and in high definition television and known as a microelectromechanical system (MEMS). The entire array can be broadly illuminated by a single laser. Alternatively, the laser can be focused onto the array by a digital optical element that creates an individual laser beam for each mirror, thereby avoiding any loss of light that strikes the array between the mirrors. Each mirror can be moved to illuminate or darken a pixel, as needed.

In order to make a color display, a plurality of lasers of different wavelengths is used to illuminate the array. One laser illuminates the array at a time. The lasers are activated in rapid succession. Currently, only red and blue lasers are commercially available. A green laser is not yet on the market. Hence, the color display is not a full color, but instead, is a reduced color image. Beam splitters may be employed to make the optical paths coaxial to avoid loss of convergence with changes in distance relative to the viewing surface, or the lasers may be placed close together to avoid significant parallax errors. Preferably, the resolution of the MEMS array is 160×160 pixels, which is similar to that achieved in personal digital assistants.

A 160×160 array of VCSELs could also be used. Even if all the pixels had to be simultaneously illuminated, it is not necessary to energize all the lasers at once. The array of lasers can be rapidly scanned, illuminating only as many at one time as can be accommodated by an available power supply.

A display could also be made by mechanically scanning a single line array of 160 lasers, all aimed at a moving mirror that reciprocally scans the entire array. Alternately, the entire array can be moved. To minimize power consumption, smaller groups of the lasers are energized at one time. A single scan mirror can be oscillated in two mutually orthogonal directions, as opposed to moving two mirrors in two respective directions.

A color display can be built by scanning three linear arrays of lasers simultaneously, with different color lasers in each array. A single mirror can scan all three arrays, or all three arrays can be moved together.

Other than moving a mirror and/or a light source, other scan mechanisms include rotating a mirrored polygon, moving a lens or other optical element, or a non-mechanical beam deflector such as an acousto-optical system or an electrically controlled grating. Each sweep along the X-axis need not be linear. A non-raster type display is also contemplated.

As described above, the X-axis rate of scanning is higher than for the Y-axis. The assembly can be turned 90° so that the Y-axis rate of scanning is higher along the vertical direction.

Figure 34:
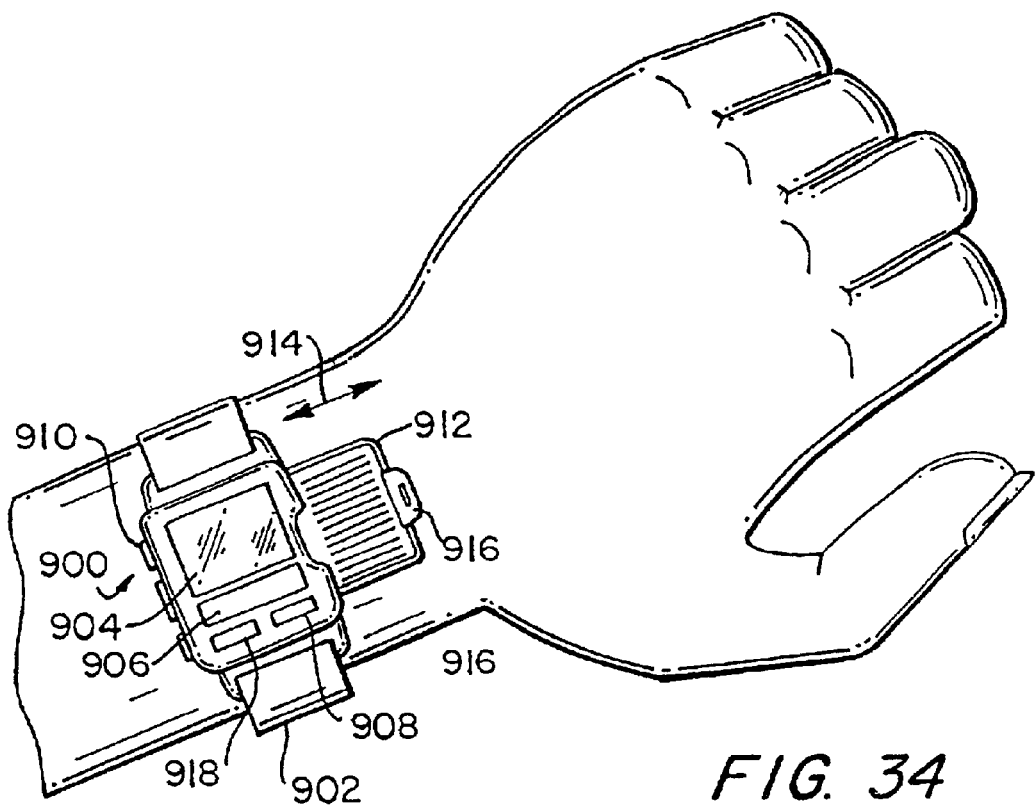
FIG. 34 is a perspective view of a wearable instrument according to this invention.
Figure 35:
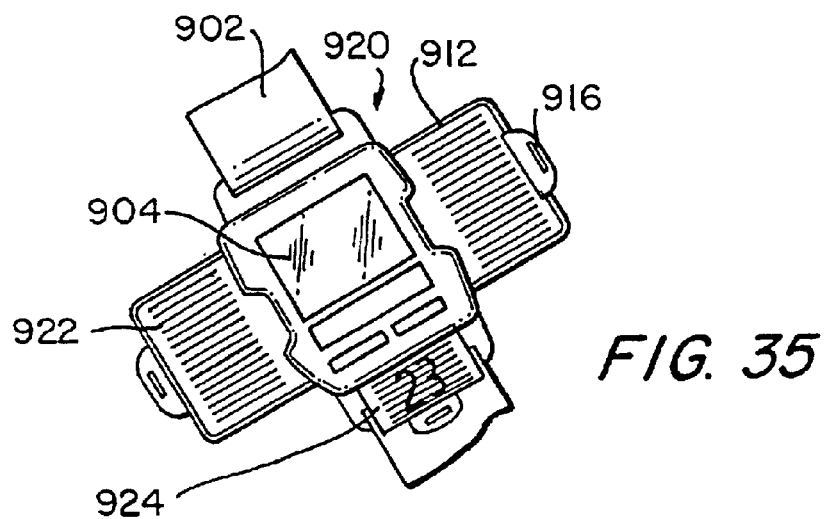
FIG. 35 is a perspective view of another wearable instrument.
Figure 36:
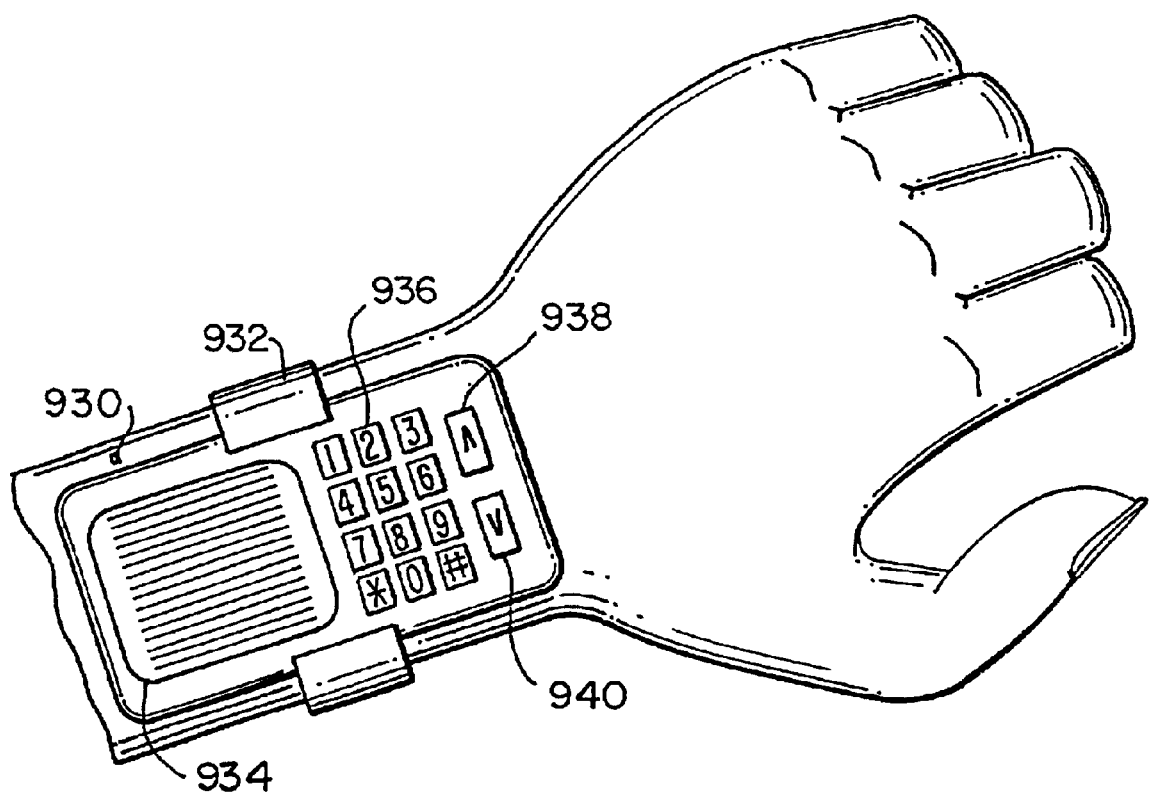
FIG. 36 is a perspective view of still another wearable instrument.

Turning now to the embodiments of FIGS. 34–36, the above-described electro-optical assembly or arrangement for projecting and displaying an image for viewing by a human eye is mounted in, and supported by, a housing that is wearable on a user's arm in configurations resembling a watch. FIG. 34 depicts a housing 900 having a band 902 encircling the user's wrist. The band may be expandable, or may comprise two straps fastened together by a buckle or like fastener.

An LCD screen 904 is located on the housing, for displaying information to the user. A keyboard 906 is located adjacent the LCD screen, for enabling the user to manually enter data. Control buttons 908, 910 are used for controlling the operation of the watch, including the functionality of the keyboard and the LCD screen 904.

A screen 912 is mounted on the housing 900 for movement in the directions of double-headed arrow 914 between a concealed position within the housing and an exposed position as illustrated. A handle 916 enables the user to grip the screen 912.

As described above, a scanner within the housing sweeps a laser beam generated by an on-board laser along a plurality of light paths over the screen 912 in the exposed position.

An on-board controller energizes the laser at selected positions to generate individual light pixels at the selected positions, and at a refresh rate at which the pixels persist to enable the human eye to steadily view the image which is comprised of a light pattern of the pixels on the screen 912. The image can include any message or graphic and can include, by way of example, an appointment calendar coupled with appointment times, and can complement, or be independent of, the information displayed on LCD screen 904. A control button 918 is depressed to activate the controller and, in other applications, to initiate the transfer of on-board data to a remote host or network by wireless transmission.

FIG. 35 is analogous to FIG. 34, but shows a modified housing 920 having another screen 922 mounted at a side of the housing opposite to the screen 912 and, optionally, still another screen 924 mounted at a lower side of the housing. One or more of these screens 916, 922, 924 can be used to display the information.

FIG. 36 shows still another modified housing 930 having a wrist band 932, a screen 934, a keyboard 936, and scroll buttons 938, 940. As before, the laser is energized and deenergized at the selected positions to create the light pattern on the screen 934. The screen 934 is preferably backlit to improve contrast. The housing 930 may include a solid-state, two-dimensional array of sensors to detect light returning to the housing, as well as a transceiver and an antenna for transmitting and receiving data to and from a remote host such as a local area network by wireless transmission, preferably using the Spectrum 24 protocol under the IEEE 802.11 standard. The housing may further include a microphone and a speaker for transmitting and receiving audio signals to and from the local area network, again by wireless transmission, preferably using the voice-over-IP protocol.

The screen 934, in the preferred embodiment includes multiple characters arranged on multiple lines in a generally rectangular display.

Another feature of this invention relates to activation of the laser by object sensing as described in U.S. patent application Ser. No. 09/855,771, filed May 12, 1997, the entire contents of which are hereby incorporated by reference herein.

One dimensional VCSEL arrays can be used in hybrid laser projection displays and 2D bar code scanners. The devices are called hybrid, since in one dimension the scanning is accomplished by turning the individual laser on and off along the array, while a scan mirror provides the scanning in the other direction.

The present invention provides use several parallel columns (or rows, depending on the orientation) of VCSELs to provide additional functionality to the hybrid display or bar code scanner.

With a single VCSEL array there is a non-negligible probability that at least one of the VCSELs may be defective, thus rendering he entire chip unusable since the entire scan line that should be illuminated by the defective VCSEL remains "dark". This reduces the overall yield and increases the device cost. The redundancy significantly reduces the probability of a dark scan line, since another laser from the next column can be used instead.

Other columns can be placed in a manner that is staggered with respect to the first column, and can increase the resolution of the device without increasing the size of the chip.

A photodiode array (or several Photodiodes) can be placed on another VCSEL column, and it can serve as feedback for the original laser array, thus ensuring uniform illumination, which is particularly important for display applications. The point is that if one is able to monitor the power output of a VCSEL, we have very good certainty that nearby devices have the same output power at the same driver current. However, power variation on a large chip can be significant, and cause uneven illumination without feedback.

If the probability of a single VCSEL being defective is p, then the probability that all the VCSELs are operated in an array of N VCSELs is $(1-p)^N$. If we have more than one VCSEL columns in parallel to each other, and we can choose a VCSEL either following probability of a working system. If we have the option to choose one of m VCSELs for each line (i.e. there are m columns), then the probability that there is an array with at least one working VCSEL in each row is $(1-p^m)^N$.

As an example, if p=0.001, N=160, and m=1 (i,e, a 160×1 VCSEL array), then the probability of a die with all VCSELs working is 85%. On the other hand, if m=2 (i.e. a 160×2 VCSEL array), the yield increases to 99.98%, since now both VCSEL in the same row have to simultaneously fail to render that row "dark".

For scanning applications it does not matter that the operational VCSELs are not along a straight vertical line. For display applications this would be a problem, but it can be remedied as follows. Since in a hybrid system the same laser is used to illuminate all pixels along a line by scanning a horizontal mirror, the VCSEL can be turned on when the horizontal mirror is aiming at the pixel that is to be illuminated. It is therefore a simple task to turn the laser on at the appropriate time, based on the feedback from the mirror's angular position.

It is also important to point out that since the size of the active VCSEL area is very small compared to the size of the chip, addling an additional column of VCSELs should not significantly increase the cost of the device.

Figure 37A:
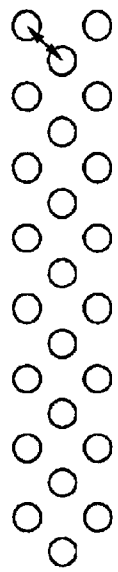
FIGS. 37a and 37b illustrate two arrays of VCSELs.
Figure 37B:
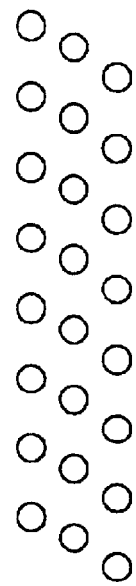
Figure 38A:
FIGS. 38a, 38b, 38c, 38d, and 38e illustrates different operational configuration of lasers in a 2×2 VCSEL array.
Figure 38B:
Figure 38C:
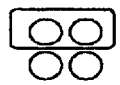
Figure 38D:
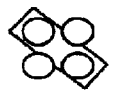
Figure 38E:
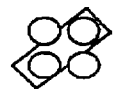

FIG. 37 shows that adjacent VCSEL columns can be placed in a staggered fashion to provide additional vertical resolution even though the minimum distance between the VCSELs is limited t a finite distance due to heating. The issue of horizontal displacement of the VCSELs along the vertical line can be addressed as was explained in above.

The size of a typical single-mode VCSEL's active area is less than 10 micrometers. However, primarily due to heating issues, VCSELs are usually not placed closer than 50 micrometer center-to-center. In order to obtain a resolution N, one needs N VCSELs in the array. For instance, to achieve a display with the Palm™ Computer display resolution of 160, one needs 160 VCSELs, which translates to a chip length of approximately 160×50 micron=8 mm. The width of the chip would be determined by mechanical and handling considerations, and it would be typically be several hundred micrometers wide even for a 160×1 VCSEL array. One can therefore include several columns of VCSELs without increasing the width of the chip. If we were to include 2 columns with 25 micron vertical spacing, the length of the chip would decrease by a factor of two for the same resolution, or alternatively the resolution can be doubled for the same chip length. Similarly, we can include 3 columns, reducing the chip length by a factor of three, while maintaining the same resolution and chip width, as shown in FIG. 38. With more than five columns the vertical resolution is limited by the size of the active area of the VCSEL.

We can in principal use several VCSEL columns, and obtain a combination of the above mentioned benefits; some of the columns can be used for increased resolution, some of the columns for yield increase, and one of the columns for feedback.

It is advantageous to adaptively change the size of the laser spot in a bar code scanners, depending on the conditions. For instance, sometimes it is necessary to reduce the speckle noise or read poorly printed bar codes, in which case an elliptical spot is needed. In other case on may wish to tilt the spot.

By using a two dimensional VCSEL array, we can adjust the spot size an orientation within the resolution of the VCSELs.

As known in the art of elliptical beam may be produced using an elliptical VCSEL aperture may be part of encapsulated laser diode. Alternatively, as described in U.S. patent application Ser. No. 09/568,342 filed May 10, 2000, herein incorporated by reference the laser beam may be elongated in a direction perpendicular to the scan direction by employing two or more VCSELS adjacent or partially overlapping VCSEL beams arranged in a line perpendicular to the scan direction. The degree of elongation and intensity may be controlled by selectively turning on one or more of the VCSELS. Advantageously, the VCSELS producing plural beams may be separate vertical cavities on a common substrate which are independently controllable.

FIG. 38 shows an example of a 2×2 array. The various configurations (FIGS. 38a, 38b, 38c, 38d, and 38e) show that by turning on different lasers, indicated by encircling them in the Figure, can provide different shapes and orientations. This concept can of course be extended to a 3×3 or greater number of VCSEL arrays.

It is important to point out that the active area of a single mode VCSEL is typically less than 10 micrometers, while a physical VCSEL chip is several hundred micrometers on a side, in order to facilitate handling. Therefore the cost of the device is not linearly proportional to the number of active lasers. The increase in cost would be primarily determined by the yield on the wafer, since with lower yields it is more difficult to obtain good dies with more active device on them.

The above approach assumes independent VCSELs, which can be turned on individually, and are incoherent sources. There are methods to phase lock adjacent devices by allowing the evanescent fields of the active regions to overlap neighboring devices. That way one can obtain a large diameter super: single-mode device, that is actually made of several individual, but coherent devices.

We can also shape the laser spot by activating some or all of the individual devices in the phase-locked laser array, as shown in FIG. 37. The advantage of the coherent scheme, is that we can have a truly single mode beam in all orientations. This is especially important if we wish to control the spot size in the direction of the scanning beam.

Using phase locking techniques, we can also steer the beam by continually adjusting the phase relationship between the adjacent devices. This is similar to the concept of phased array radars. However, the angular resolution of the system depends on the number of individual devices that make up the source. To read a bar code we need a resolution of several hundred to a thousand, which present a practical difficulty, since it would be a very large and potentially expensive device.

Figure 39:
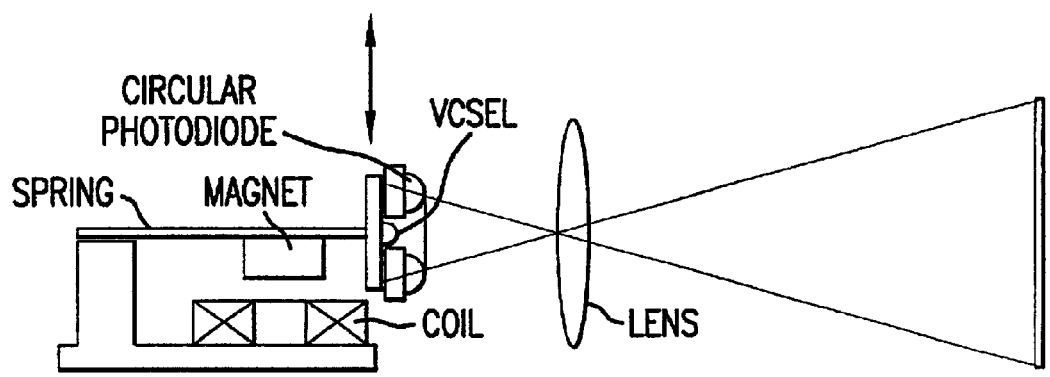
FIG. 39 illustrates a scanning technique with a single VCSEL.

In another embodiment, a VCSEL is linearly scanned in front of a lens, which acts as both focusing and collection lens (FIG. 39), providing that photodiode(s) are placed around the VCSEL.

Also, the VCSEL can be scanned along two axes, providing for 2D scanning or laser display capabilities.

Figure 40:
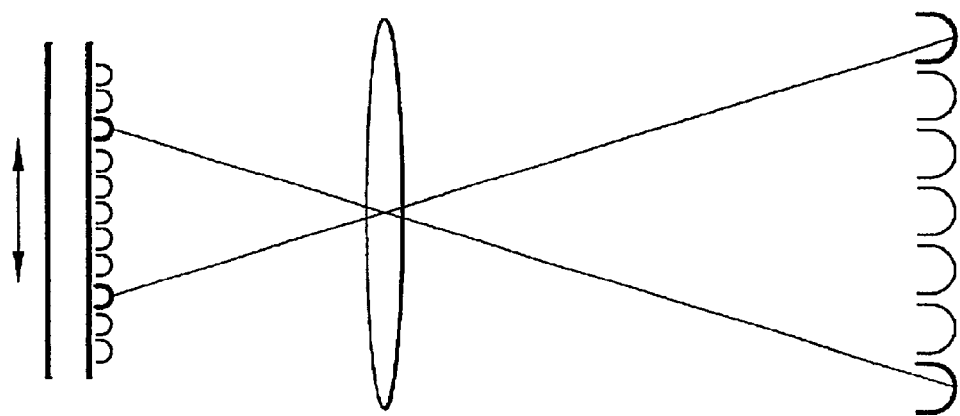
FIG. 40 illustrates an array of VCSELs being scanned.

Alternatively, the array of VCSEls can be used, which would reduce the required scan amplitude and allow higher scan frequency (FIG. 40). Alternatively, LEDs can be used instead of VCSELS.

This invention is not intended to be limited to rear projection, and is expressly intended to include front projection where the light source is on the viewing side or front surface of a built-in screen, and the screen preferably has a reflective/diffusive property on its rear surface.

While the invention has been illustrated and described as embodied in an electro-optical assembly for image projection, especially in hand-held or wearable instruments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An arrangement for displaying an image for viewing by a human eye, comprising:
   a) a housing having a movable screen which has a front surface and a rear surface, and an optically diffusive property;
   b) an energizable laser supported by the housing for projecting a laser beam toward the rear surface of the screen when energized and upon moving the screen to a deployed position;
   c) a scanner supported by the housing for sweeping the laser beam along a plurality of light paths over the rear surface of the screen for diffusion therethrough; and
   d) a controller supported by the housing and operatively connected to, and operative for energizing, the laser at selected positions of the laser beam in at least one of the light paths to generate individual light pixels at the selected positions, and at a refresh rate at which the pixels persist to enable the eye to steadily view the image comprised of a light pattern of the pixels visible on the front surface of the screen.

2. The arrangement of claim 1, wherein the scanner includes a first scan mirror for sweeping the laser beam along a first direction along said at least one of the light paths, and a second scan mirror for sweeping the laser beam along second direction generally orthogonal to the first direction, and wherein the controller is operative or energizing and deenergizing the laser as the laser beam is swept along a plurality of each of the light paths.

3. The arrangement of claim 2, wherein the first scan mirror is moved at a first rate of speed through a first angular distance, and wherein the second scan mirror is moved at a second rate of speed slower than said first speed, and through a second angular distance greater than said first angular distance.

4. The arrangement of claim 2, wherein the controller is operatively connected to a memory having stored fronts and timing data as to when to energize and deenergize the laser to display the image as font characters.

5. The arrangement of claim 1, wherein the housing has a size and a shape configured to be held in a user's hand.

6. The arrangement of claim 1, and further comprising a transceiver for transmitting and receiving data by wireless transmission to a remote host.

7. The arrangement of claim 1; and further comprising a single scan mirror, and wherein the scanner is operative for moving the scan mirror along a plurality of directions.

8. The arrangement of claim 1, wherein the light pattern constitutes a generally rectangular display.

9. The arrangement of claim 1; and further comprising a plurality of additional energizable lasers of the same wavelength as the first-mentioned laser, for increasing the number of the light pixels without having to increase the rate at which the scanner sweeps the respective laser beams.

10. The arrangement of claim 1, wherein the screen has an optical filter characteristic for blocking ambient light but transmitting the laser beam in order to enhance image contrast on the screen.

11. The arrangement of claim 1, wherein the laser, the scanner and the controller are mounted on a common support to constitute a module.

12. The arrangement of claim 11, wherein the screen is larger in area than the module.

13. An arrangement for displaying an image for viewing by a human eye, comprising:
   a) a housing having a screen which has a rear surface;
   b) an energizable laser supported by the housing for projecting a laser beam toward the rear surface of the screen when energized;
   c) a scanner supported by the housing for sweeping the laser beam along a plurality of light paths over the rear surface of the screen; and
   d) a controller supported by the housing and operatively connected to, and operative for energizing, the laser at selected positions of the laser beam in at least one of the light paths to generate individual light pixels at the selected positions, and at a refresh rate at which the pixels persist to enable the eye to steadily view the image comprised of a light pattern of the pixels on the screen, and for changing a size of the light pattern as a function of screen position to adapt image size to screen size.

14. The arrangement of claim 13, wherein the scanner includes a first scan mirror for sweeping the laser beam along a first direction along said at least one of the light paths, and a second scan mirror for sweeping the laser beam along second direction generally orthogonal to the first direction, and wherein the controller is operative or energizing and deenergizing the laser as the laser beam is swept along a plurality of each of the light paths.

15. The arrangement of claim 14, wherein the first scan mirror is moved at a first rate of speed through a first angular distance, and wherein the second scan mirror is moved at a second rate of speed slower than said first speed, and through a second angular distance greater than said first angular distance.

16. The arrangement of claim 14, wherein the controller is operatively connected to a memory having stored fonts and timing data as to when to energize and deenergize the laser to display the image as font characters.

17. The arrangement of claim 14, and her comprising a transceiver for transmitting and receiving data by wireless transmission to a remote host.

18. The arrangement of claim 13, wherein the housing has a size and a shape configured to be held in a user's hand.

19. The arrangement of claim 13, wherein the screen has an optically diffusive property and is movable to a deployed position in which the swept light beam is incident on the rear surface of the screen and is diffused through the screen to render the image visible on a front surface of the screen.

20. The arrangement of claim 13; and further comprising a single scan mirror, and wherein the scanner is operative for moving the scan mirror along a plurality of directions.

21. The arrangement of claim 13, wherein the light pattern constitutes a generally rectangular display.

22. The arrangement of claim 13; and further comprising a plurality of additional energizable lasers of the same wavelength as the first-mentioned laser, for increasing the number of the light pixels without having to increase the rate at which the scanner sweeps the respective laser beams.

23. The arrangement of claim 13, wherein the screen has an optical filter characteristic for blocking ambient light but transmitting the laser beam in order to enhance image contrast on the screen.

24. The arrangement of claim 13, wherein the laser, the scanner and the controller are mounted on a common support to constitute a module.

25. The arrangement of claim 24, wherein the screen is larger in area than the module.

26. An arrangement for displaying an image for viewing by a human eye, comprising:
   a) a housing having a screen which has a rear surface;
   b) an energizable laser supported by the housing for projecting a laser beam toward the rear surface of the screen when energized;
   c) a scanner supported by the housing for sweeping the laser beam along a plurality of light paths over the rear surface of the screen;
   d) a controller supported by the housing and operatively connected to, and operative for energizing, the laser at selected positions of the laser beam in at least one of the light paths to generate individual light pixels at the selected positions, and at a refresh rate at which the pixels persist to enable the eye to steadily view the image comprised of a light pattern of the pixels on the screen; and
   e) a sensing element for sensing ambient light to provide brightness adjustment on the screen.

27. The arrangement of claim 26, wherein the scanner includes a first scan mirror for sweeping the laser beam along first direction along said at least one of the light paths, and a second scan mirror for sweeping the laser beam along second direction generally orthogonal to the first direction, and wherein the controller is operative for energizing and deenergizing the laser as the laser beam is swept along a plurality of each of the light paths.

28. The arrangement of claim 27, wherein the first scan mirror is moved at a first rate of speed through a first angular distance, and wherein the second scan mirror is moved at a second rate of speed slower than said first speed, and through a second angular distance greater than said first angular distance.

29. The arrangement of claim 27, wherein the controller is operatively connected to a memory having stored fonts and timing data as to when to energize and deenergize the laser to display the image as font characters.

30. The arrangement of claim 26, wherein the housing has a size and a shape configured to be held in a user's hand.

31. The arrangement of claim 26, wherein the screen has an optically diffusive property and is movable to a deployed position in which the swept light beam is incident on the rear surface of the screen and is diffused through the screen to render the image visible on a front surface of the screen.

32. The arrangement of claim 26, and further comprising a transceiver for transmitting and receiving data by wireless transmission to a remote host.

33. The arrangement of claim 26; an further comprising a single scan mirror, and wherein the scanner is operative for moving the scan mirror along a plurality of directions.

34. The arrangement of claim 26, wherein the light pattern constitutes a generally rectangular display.

35. The arrangement of claim 26; and further comprising a plurality of additional energizable lasers of the same wavelength as the first-mentioned laser, for increasing the number of the light pixels without having to increase the rate at which the scanner sweeps the respective laser beams.

36. The arrangement of claim 26, wherein the screen has an optical filter characteristic for blocking ambient light but transmitting the laser beam in order to enhance image contrast on the screen.

37. The arrangement of claim 26, wherein the controller is operative for changing a size of the light pattern as a function of screen position so as to adapt image size to screen size.

38. The arrangement of claim 26, wherein the controller is operative for energizing the laser at selected positions of the laser beam to generate individual light pixels depicting a cursor that is movable across the light pattern.

39. The arrangement of claim 26, wherein the laser, the scanner and the controller are mounted on a common support to constitute a module.

40. The arrangement of claim 39, wherein the screen is larger in area than the module.

41. An arrangement for displaying an age for viewing by a human eye, comprising:
  a) a housing having a screen which has a rear surface;
  b) an energizable laser supported by the housing for projecting a laser beam toward the rear surface of the screen when energized;
  c) a scanner supported by the housing for sweeping the laser beam along a plurality of light paths over the rear surface of the screen; and
  d) a controller supported by the housing and operatively connected to, and operative for energizing, the laser at selected positions of the laser beam in least one of the light paths to generate individual light pixels at the selected positions, and at a refresh rate at which the pixels persist to enable the eye to steadily view the image comprised of a light pattern of the pixels on the screen, the controller being operative for energizing the laser at selected positions of the laser beam to generate individual light pixels depicting a cursor that is movable across the light pattern.

42. The arrangement of claim 41, wherein the scanner includes a first scan mirror for sweeping the laser beam along a first direction along said at least one of the light paths, and a second scan mirror for sweeping the laser beam along a second direction generally orthogonal to the first direction, and wherein the controller is operative for energizing and deenergizing the laser as the laser beam is swept along a plurality of each of the light paths.

43. The arrangement of claim 42, wherein the first scan mirror is moved at a first rate of speed through a first angular distance, and wherein the second scan mirror is moved at a second rate of speed slower than said first speed, and through a second angular distance greater than said first angular distance.

44. The arrangement of claim 42, wherein the controller is operatively connected to a memory having stored fonts and timing data as to when to energize and deenergize the laser to display the image as font characters.

45. The arrangement of claim 41, wherein the housing has a size and a shape configured to be held in a user's hand.

46. The arrangement of claim 41, wherein the screen has an optically diffusive property and is movable to a deployed position in which the swept light beam is incident on the rear surface of the screen and is diffused through the screen to render the image visible on a front surface of the screen.

47. The arrangement of claim 41, and further comprising a transceiver for transmitting and receiving data by wireless transmission to a remote host.

48. The arrangement of claim 41; and further comprising a single scan mirror, and wherein the scanner is operative for moving the scan mirror along a plurality of directions.

49. The arrangement of claim 41, wherein the light pattern constitutes a generally rectangular display.

50. The arrangement of claim 41; and further comprising a plurality of additional energizable lasers of the same wavelength as the first-mentioned laser, for increasing the number of the light pixels without having to increase the rate at which the scanner sweeps the respective laser beams.

51. The arrangement of claim 41, wherein the scan has an optical filter characteristic for blocking ambient light but transmitting the laser beam in order to enhance image contrast on the screen.

52. The arrangement of claim 41, wherein the controller is operative for changing a size of the light pattern as a function of screen position so as to adapt image size to screen size.

53. The arrangement of claim 41; and further comprising a sensing element for sensing ambient light to provide brightness adjustment on the screen.

54. The arrangement of claim 41, wherein the laser, the scanner and the controller are mounted on a common support to constitute a module.

55. The arrangement of claim 54, wherein the screen is larger in area than the module.

* * * * *